US011307093B2

(12) United States Patent
Nagai et al.

(10) Patent No.: US 11,307,093 B2
(45) Date of Patent: *Apr. 19, 2022

(54) METHOD OF CALIBRATING SPECTRAL APPARATUS AND METHOD OF PRODUCING CALIBRATED SPECTRAL APPARATUS

(71) Applicant: KONICA MINOLTA INC., Chiyoda-ku (JP)

(72) Inventors: Yoshiroh Nagai, Nishinomiya (JP); Toshio Kawano, Sakai (JP); Takashi Kawasaki, Sakai (JP)

(73) Assignee: Konica Minolta, Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/986,884

(22) Filed: Aug. 6, 2020

(65) Prior Publication Data

US 2020/0363262 A1    Nov. 19, 2020

Related U.S. Application Data

(63) Continuation of application No. 15/746,216, filed as application No. PCT/JP2016/069999 on Jul. 6, 2016, now Pat. No. 10,768,048.

(30) Foreign Application Priority Data

Jul. 29, 2015   (JP) .................... 2015-149428

(51) Int. Cl.
    *G01J 3/02* (2006.01)
    *G01J 3/06* (2006.01)
    *G01J 3/36* (2006.01)

(52) U.S. Cl.
    CPC .............. *G01J 3/0297* (2013.01); *G01J 3/06* (2013.01); *G01J 3/36* (2013.01)

(58) Field of Classification Search
    CPC ..... G01J 3/0297; G01J 3/06; G01J 3/18; G01J 3/28; G01J 3/36
    See application file for complete search history.

(56) References Cited

U.S. PATENT DOCUMENTS

| | | | |
|---|---|---|---|
| 2003/0011767 A1 | 1/2003 | Imura | |
| 2006/0290929 A1 | 12/2006 | Imura | |
| 2007/0229666 A1* | 10/2007 | Berestov | H04N 9/04557 348/187 |

FOREIGN PATENT DOCUMENTS

| | | |
|---|---|---|
| JP | 2000-121436 | 4/2000 |
| JP | 2001-165770 | 6/2001 |

(Continued)

OTHER PUBLICATIONS

Zhimin Peng et al., "A Novel Wavelength Calibration for Fiber-Optical Spectrographs Based on the Grating-Diffractive Equation", Applied Spectroscopy, 2008, vol. 62, No. 7, pp. 819-823.

*Primary Examiner* — Hina F Ayub
(74) *Attorney, Agent, or Firm* — Cozen O'Connor

(57) ABSTRACT

Creating a model calibrating spectral apparatus having an optical system that converts light to be measured into a spectrum, and a light-receiving sensor including a plurality of sensors that outputs signals, the sensors include sensors that output signals indicating respective energy amounts of a plurality of wavelength components. The model shows where a linear function of an indicator indicating a mechanical error in the spectral apparatus, expresses deviation of an indicator indicating spectral sensitivity of the sensor from the indicator indicating the reference spectral sensitivity of the sensor. The method comprises: a) acquiring reference spectral sensitivity; b) acquiring an indicator indicating the reference spectral sensitivity of the sensor acquired at a); and c) creating the model where the linear function of the mechanical error indicator expresses deviation of the spec- (Continued)

tral sensitivity indicator from the indicator indicating the reference spectral sensitivity of the sensor, acquired at b).

6 Claims, 22 Drawing Sheets

(56) References Cited

FOREIGN PATENT DOCUMENTS

| JP | 2002-168690 | 6/2002 |
| JP | 4660694 | 1/2007 |
| JP | 2007-192747 | 8/2007 |
| JP | 2011-242314 | 12/2011 |
| JP | 2013-88263 | 5/2013 |
| JP | 2014-98653 | 5/2014 |

* cited by examiner

METHOD OF CALIBRATING SPECTRAL APPARATUS AND METHOD OF PRODUCING CALIBRATED SPECTRAL APPARATUS

RELATED APPLICATION

This application is a Continuation of U.S. application Ser. No. 15/746,216 filed Jan. 19, 2018 which is a U.S. National Stage Application under 35 USC § 371 of International application No. PCT/JP2016/069999 filed Jul. 6, 2016, which claims priority of Japanese patent application no. 2015-149428 filed Jul. 29, 2015, the entire content of all of which are hereby incorporated by reference.

TECHNICAL FIELD

The present invention relates to calibration of a spectral apparatus.

BACKGROUND ART

A spectral apparatus including a polychromator, includes sensors that output signals indicating the respective energy amounts of a plurality of wavelength components. Spectral characteristics, such as spectral reflectance, spectral radiance, and spectral transmittance, are acquired from the plurality of signals output by the plurality of sensors.

The spectral sensitivity of each of the sensors varies depending on, for example, the arrangement, shape, and size of a light-receiving sensor, and varies depending on, for example, the arrangement, shape, and size of a slit plate or a diffraction grating included in the polychromator. Therefore, the spectral sensitivity of such a sensor, fundamental in the spectral characteristics, must be calibrated per spectral apparatus.

A wavelength calibration method of a spectral apparatus described in Patent Literature 1, includes: giving a difference from the reference value of the center wavelength in spectral sensitivity by a linear function of pixel number (paragraph 0026); giving a ratio to the reference value of the full width at half maximum in the spectral sensitivity by a linear function of pixel number (paragraph 0028); creating a corrected spectral sensitivity table with the center wavelength in the spectral sensitivity and the ratio to the reference value of the full width at half maximum in the spectral sensitivity (paragraph 0029), and determining coefficients included in each of the linear functions of pixel number such that calculated relative output calculated with the corrected spectral sensitivity table and emission-line wavelengths and measured relative output are values closest to each other (paragraph 0033).

CITATION LIST

Patent Literature

Patent Literature 1: JP 4660694 B2

SUMMARY OF INVENTION

Technical Problem

The wavelength calibration method of a spectral apparatus described in Patent Literature 1, includes: giving a difference from the reference value of the center wavelength in spectral sensitivity by a linear function of pixel number; and giving a ratio to the reference value of the full width at half maximum in the spectral sensitivity by a linear function of pixel number. However, the difference may be considerably different from the linear function of pixel number or the ratio may be considerably different from the linear function of pixel number, in a practical spectral apparatus. Giving the difference by the linear function of pixel number and giving the ratio by the linear function of pixel number each are not favorable approximation, and thus the spectral sensitivity is not acquired precisely in these cases. Giving the difference by a higher order function being a quadratic function of pixel number or more and giving the ratio by a higher order function being a quadratic function of pixel number or more, are considered, but correction of coefficients with the higher order functions greatly changes calculated relative output, and thus the coefficients with which the calculated relative output and measured relative output are values closest to each other, are not appropriately acquired and the spectral sensitivity is not appropriately acquired.

The invention below has been made in order to solve the problem. An object of the invention below is to acquire spectral sensitivity precisely and appropriately.

Solution to Problem

A spectral apparatus to be calibrated, includes an optical system and a light-receiving sensor. The optical system converts light to be measured into a spectrum. The light-receiving sensor includes a plurality of sensors that outputs a plurality of signals, the plurality of sensors including sensors that outputs signals indicating the respective energy amounts of a plurality of wavelength components included in the spectrum.

For each of the plurality of sensors, the reference spectral sensitivity of the sensor is acquired, and an indicator indicating the reference spectral sensitivity of the sensor that has been acquired, is acquired. A model in which a linear function of an indicator indicating a mechanical error in the spectral apparatus, expresses the deviation of an indicator indicating the spectral sensitivity of the sensor from the indicator indicating the reference spectral sensitivity of the sensor, that has been acquired, is created. The indicator indicating the mechanical error in the spectral apparatus, is acquired to adapt the spectral sensitivity of the sensor indicated by the indicator indicating the spectral sensitivity of the sensor, to the signal output by the sensor. For each of the plurality of sensors, the deviation of the indicator indicating the spectral sensitivity of the sensor from the indicator indicating the reference spectral sensitivity of the sensor, is acquired with the model that has been created and the indicator indicating the mechanical error in the spectral apparatus, which has been acquired. The spectral sensitivity of the sensor is acquired with the reference spectral sensitivity of the sensor and the deviation of the indicator indicating the spectral sensitivity of the sensor from the indicator indicating the reference spectral sensitivity of the sensor, which have been acquired.

Advantageous Effects of Invention

Since the linear function of the indicator indicating the mechanical error in the spectral apparatus expresses the indicator indicating the spectral sensitivity of the sensor, the adaptability of a spectral sensitivity set to a signal set does not greatly vary even in a case where the indicator indicating the mechanical error in the spectral apparatus, varies. Therefore, the indicator indicating the mechanical error in the spectral apparatus, is appropriately acquired, and the spectral sensitivity of the sensor is acquired precisely and appropriately.

DESCRIPTION OF EMBODIMENTS

1. Spectral Apparatus

Figure 1:
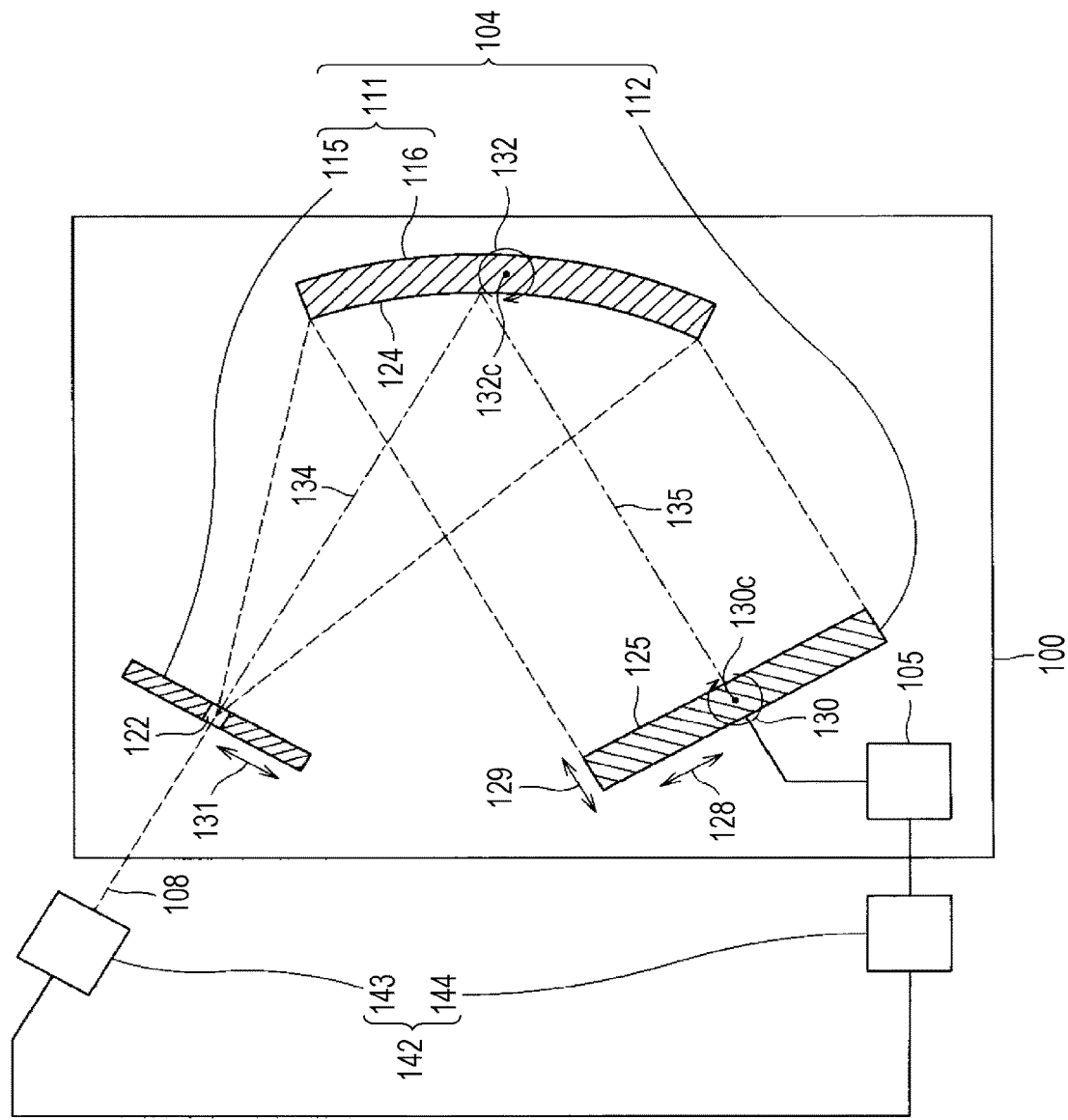
FIG. 1 is a schematic view of a spectral apparatus and a calibrating device.

The schematic view of FIG. 1 illustrates a spectral apparatus and a calibrating device. FIG. 1 illustrates a section of the spectral apparatus.

As illustrated in FIG. 1, the spectral apparatus 100 includes a spectral unit 104 and a signal processing mechanism 105.

In a case where the spectral apparatus 100 performs measurement, the spectral unit 104 receives light to be measured 108 and outputs a first signal, a second signal, . . . , and a fortieth signal indicating the energy amounts of a first wavelength component, a second wavelength component, . . . , and a fortieth wavelength component included in the light to be measured 108 that has been received, respectively. The signal processing mechanism 105 acquires spectral characteristics with the signals of the first signal, the second signal, . . . , and the fortieth signal.

In a case where the spectral apparatus 100 is a spectrophotometer, when an object to be measured is irradiated with light, the light reflected by the object to be measured is to be the light to be measured 108 and, for example, spectral reflectance is acquired as a spectral characteristic. In a case where the spectral apparatus 100 is a spectroradiometer, light emitted by a light source to be measured, is to be the light to be measured 108 and, for example, spectral radiance is acquired as a spectral characteristic. In a case where the object that has been measured is irradiated with light, the light transmitted through the object to be measured, may be the light to be measured 108 and, for example, spectral transmittance may be acquired as a spectral characteristic. A colorimetric value may be acquired as a spectral characteristic. The colorimetric value is expressed by, for example, the Munsell color system, the L*a*b* color system, the L*C*h color system, the Hunter Lab color system, or the XYZ color system.

2. Spectral Unit

Figure 2:
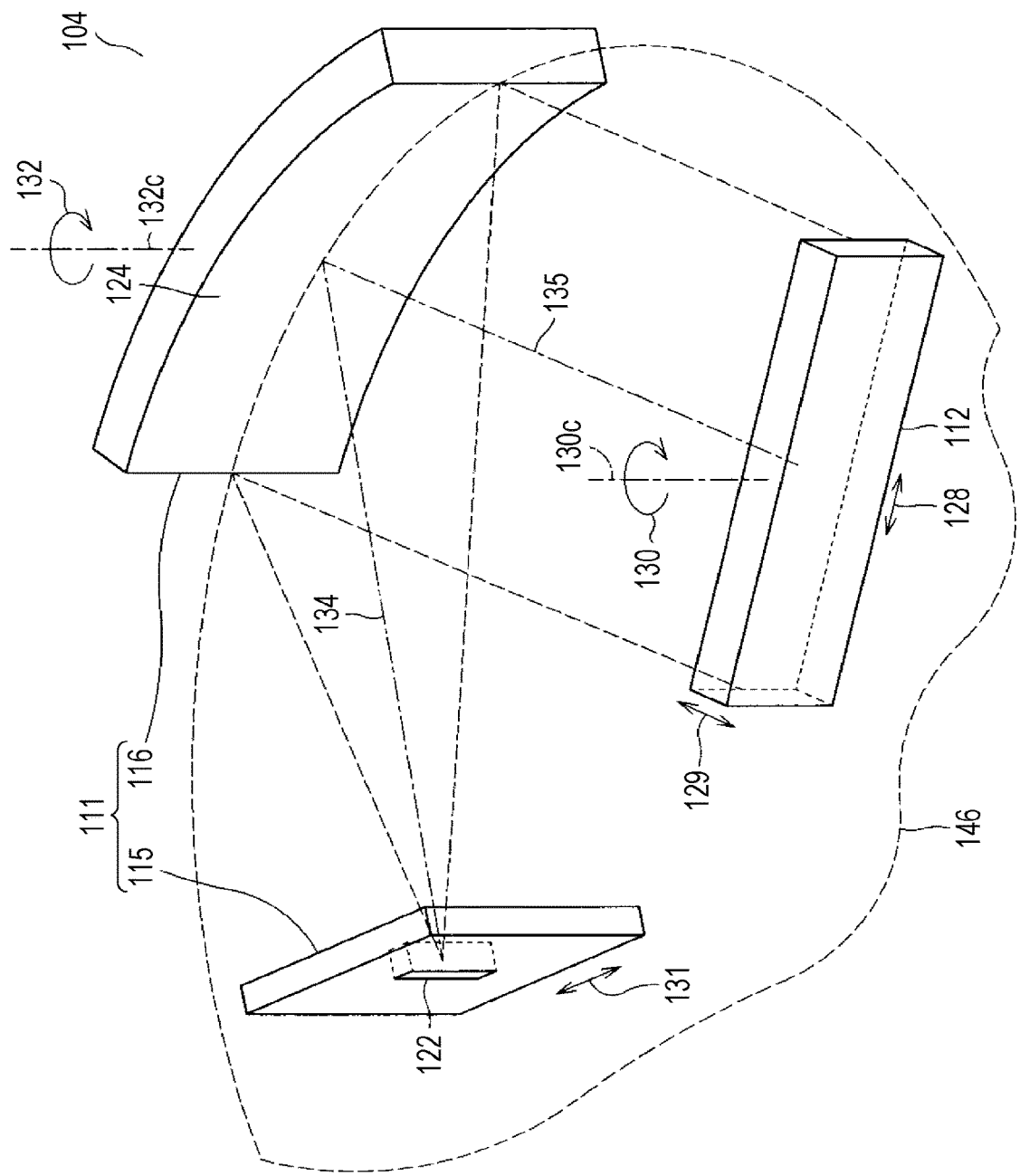
FIG. 2 is a schematic view of a spectral unit.

The schematic view of FIG. 2 is a perspective view of the spectral unit 104.

The spectral unit 104 includes an optical system 111 and a linear array sensor 112, as illustrated in FIGS. 1 and 2. The optical system 111 is a polychromator, and includes a slit plate 115 and a concave diffraction grating 116.

Figure 3:
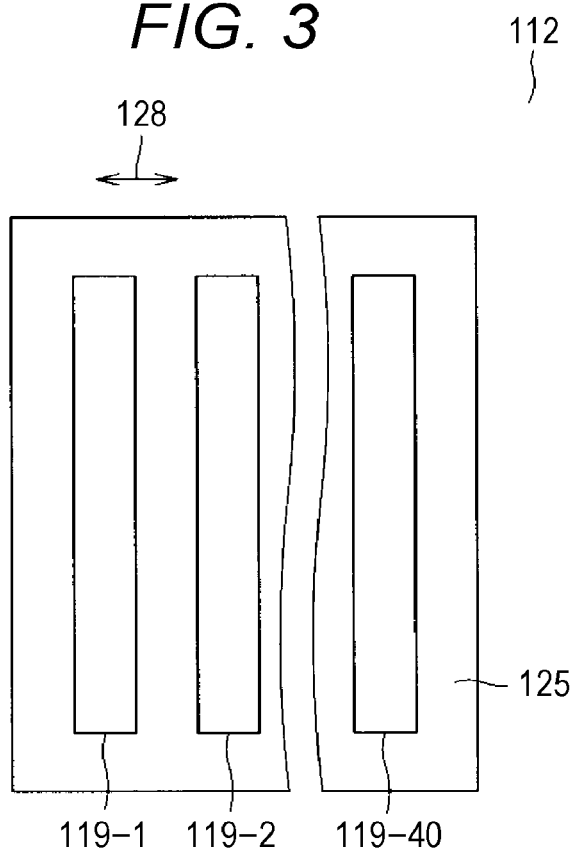
FIG. 3 is a schematic view of a linear array sensor.

The schematic view of FIG. 3 is a plan view of the linear array sensor.

The linear array sensor 112 includes sensors 119-1, 119-2, . . . , and 119-40, as illustrated in FIG. 3.

In a case where the spectral apparatus 100 performs measurement, the light to be measured 108 is guided to a rectangular slit 122 formed through the slit plate 115. The light to be measured 108 guided to the slit 122 passes through the slit 122. The light to be measured 108 that has passed through the slit 122, travels from the slit 122 to the diffraction surface 124 of the concave diffraction grating 116, and then is reflected on the diffraction surface 124. The light to be measured 108 is reflected on the diffraction surface 124, so as to be converted into a spectrum. The light to be measured 108 converted into the spectrum, travels from the diffraction surface 124 of the concave diffraction grating 116 to the light-receiving surface 125 of the linear array sensor 112, and then is image-formed on the light-receiving surface 125, so as to be received by the linear array sensor 112. The sensors 119-1, 119-2, . . . , and 119-40 are linearly arranged in a direction 128 on the light-receiving surface 125. The slit plate 115, the concave diffraction grating 116, and the linear array sensor 112 are arranged so that the light image-formed on the light-receiving surface 125 varies in wavelength in accordance with position in the direction 128. Therefore, in a case where the linear array sensor 112 receives the light to be measured 108 converted into the spectrum, the sensors 119-1, 119-2, ..., and 119-40 output the first signal, the second signal, ..., and the fortieth signal indicating the energy amounts of the first wavelength component, the second wavelength component, ..., and the fortieth wavelength component different from each other, respectively. The first signal, the second signal, ..., and the fortieth signal that have been output, are input into the signal processing mechanism 105. The signal processing mechanism 105 acquires spectral characteristics with the first signal, the second signal, ..., and the fortieth signal that have been input.

The optical system 111 has an optical axis 134 leading from the slit 122 to the diffraction surface 124 and an optical axis 135 leading from the diffraction surface 124 to the light-receiving surface 125.

The optical system 111 may be replaced with a different type of optical system. For example, the concave diffraction grating 116 may be replaced with a plane diffraction grating and a concave mirror. The slit plate 115 and the concave diffraction grating 116 may be replaced with a slit plate having a circular slit formed, a cylindrical lens, and a linear variable filter. Light to be measured that has passed through the circular slit, passes through the cylindrical lens. The pass of the light to be measured, through the cylindrical lens converts the sectional shape of the light to be measured from a circular shape into a linear shape. The light to be measured that has passed through the cylindrical lens, passes through the linear variable filter. The light to be measured passes through the linear variable filter, so as to be converted into a spectrum.

The linear array sensor 112 may be replaced with a different type of light-receiving sensor. For example, the linear array sensor 112 may be replaced with a linear array sensor including not more than 39 sensors or not less than 41 sensors. Depending on an optical system, the linear array sensor 112 may be replaced with an area sensor.

3. Signal Processing Mechanism

Figure 4:
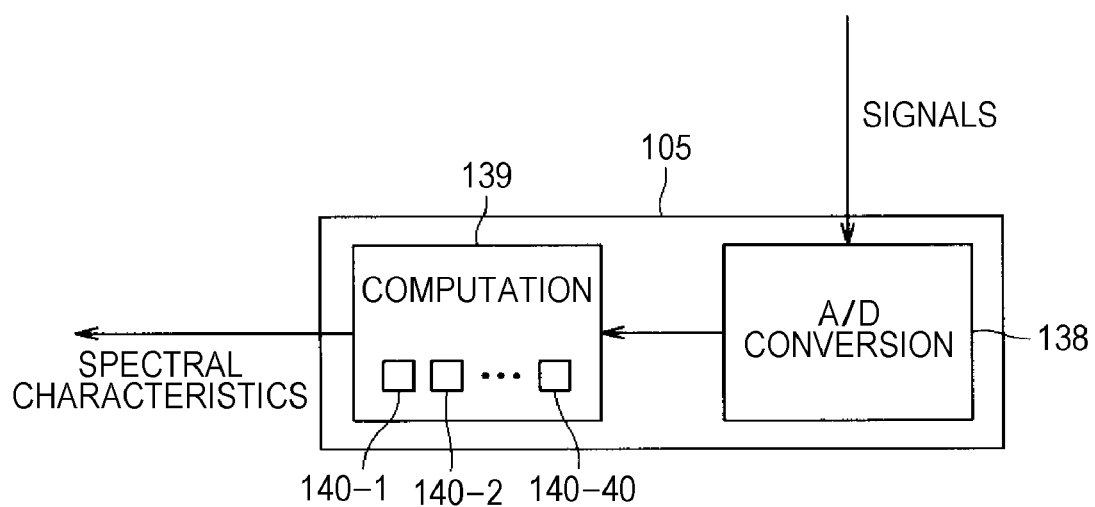
FIG. 4 is a block diagram of a signal processing mechanism.

The block diagram of FIG. 4 illustrates the signal processing mechanism.

The signal processing mechanism 105 includes an A/D conversion mechanism 138 and a computing mechanism 139, as illustrated in FIG. 4.

In a case where the first signal, the second signal, ..., and the fortieth signal are input into the signal processing mechanism 105, the first signal, the second signal, ..., and the fortieth signal are input into the A/D conversion mechanism 138. The first signal, the second signal, ..., and the fortieth signal input into the A/D conversion mechanism 138, are analog-to-digital-converted into a first signal value, a second signal value, ..., and a fortieth signal value, respectively. The first signal value, the second signal value, ..., and the fortieth signal value are input into the computing mechanism 139. The computing mechanism 139 acquires the spectral characteristics with the first signal value, the second signal value, ..., and the fortieth signal value that have been input, and the spectral sensitivity 140-1 of the sensor 119-1, the spectral sensitivity 140-2 of the sensor 119-2, ..., and the spectral sensitivity 140-40 of the sensor 119-40 stored in the computing mechanism 139. Instead of the spectral sensitivity 140-1, 140-2, ..., and 140-40, information derived from the spectral sensitivity 140-1, 140-2, ..., and 140-40, information being necessary for acquiring the spectral characteristics, may be stored in the computing mechanism 139.

The computing mechanism 139 is an embedded computer, and operates in accordance with an installed program. The entirety or part of processing to be performed by the computing mechanism 139, may be performed by an electronic circuit accompanying no program. The entirety or part of processing to be performed by the computing mechanism 139, may be manually performed.

4. Exemplary Spectral Sensitivity of Each Sensor

Figure 5:
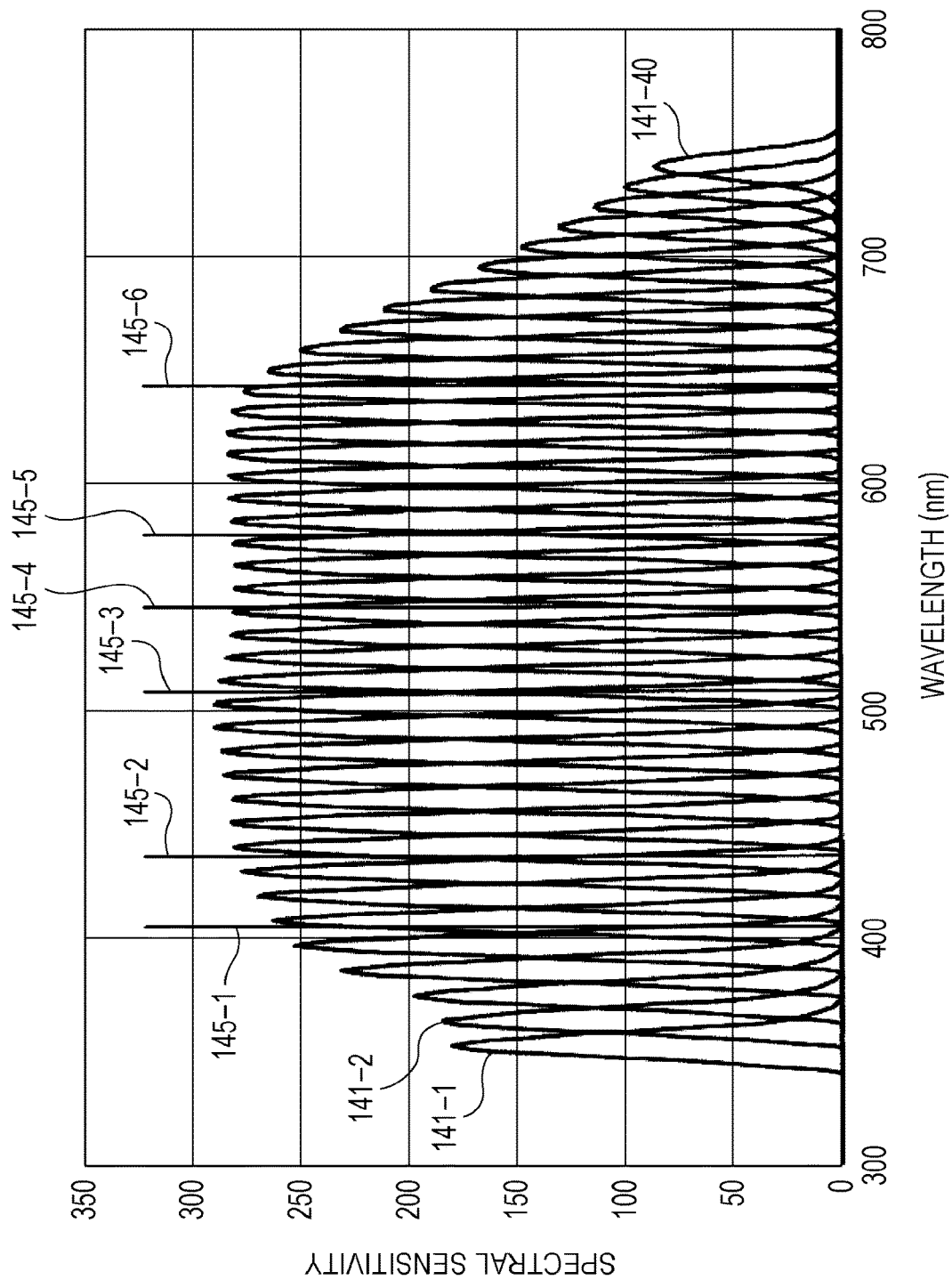
FIG. 5 is a graph exemplarily illustrating the spectral sensitivity of each sensor and an emission-line spectrum.

The graph of FIG. 5 exemplarily illustrates the spectral sensitivity of each of the sensors and the emission-line spectrum of light to be measured for emission-line calibration.

The center wavelength in the spectral sensitivity 141-1 of the sensor 119-1, the center wavelength in the spectral sensitivity 141-2 of the sensor 119-2, ..., and the center wavelength in the spectral sensitivity 141-40 of the sensor 119-40 are different from each other, and are approximately 352 nm, approximately 363 nm, ..., and approximately 740 nm, respectively, as illustrated in FIG. 5. With this arrangement, the sensors 119-1, 119-2, ..., and 119-40 output the first signal, the second signal, ..., and the fortieth signal indicating the energy amounts of the first wavelength component, the second wavelength component, ..., and the fortieth wavelength component different from each other, respectively.

5. Necessity of Calibration of Spectral Apparatus

For example, the arrangements, shapes, and sizes of the slit plate 115, the concave diffraction grating 116, and the linear array sensor 112, causes the spectral sensitivity 141-1, 141-2, ..., and 141-40 to vary. Therefore, in order to acquire the spectral characteristics precisely, the spectral sensitivity 140-1, 140-2, ..., and 140-40 stored in the computing mechanism 139 must be changed in accordance with, for example, the arrangements, shapes, and sizes of the slit plate 115, the concave diffraction grating 116, and the linear array sensor, so as to be close to the real spectral sensitivity 141-1, 141-2, ..., and 141-40, respectively. Causing the spectral sensitivity 140-1, 140-2, ..., and 140-40 stored in the computing mechanism 139 to be close to the real spectral sensitivity 141-1, 141-2, ..., and 141-40, respectively, is referred to as calibration of the spectral apparatus 100.

6. Calibrating Device

The calibrating device 142 includes an HgCd lamp 143 and a control computing mechanism 144, as illustrated in FIG. 1.

In a case where the calibration of the spectral apparatus 100 is performed with the calibrating device 142, the control computing mechanism 144 causes the HgCd lamp 143 to emit the light to be measured for emission-line calibration as the light to be measured 108. The spectral apparatus 100 measures the light to be measured for emission-line calibration that has been emitted. In a case where the spectral apparatus 100 measures the light to be measured for emission-line calibration, the first signal value, the second signal value, ..., and the fortieth signal value are input into the computing mechanism 139. The computing mechanism 139 transfers the first signal value, the second signal value, ..., and the fortieth signal value that have been input, to the control computing mechanism 144. The control computing mechanism 144 acquires the spectral sensitivity of the sensor 119-1, the spectral sensitivity of the sensor 119-2, ..., and the spectral sensitivity of the sensor 119-40 with the first signal value, the second signal value, ..., and the fortieth signal value that has been transferred, respectively. The spectral sensitivity of the sensor 119-1, the spectral sensitivity of the sensor 119-2, ..., and the spectral sensitivity of the sensor 119-40 that have been acquired, are transferred from the control computing mechanism 144 to the computing mechanism 139, so as to be the spectral sensitivity 140-1, 140-2, . . . , and 140-3 to be newly stored into the computing mechanism 139, respectively. With this arrangement, after the calibration of the spectral apparatus 100 is performed, the computing mechanism 139 can acquire the spectral characteristics with the first signal, the second signal, . . . , and the fortieth signal and the spectral sensitivity of the sensor 119-1, the spectral sensitivity of the sensor 119-2, . . . , and the spectral sensitivity of the sensor 119-40 that have been newly acquired.

The control computing mechanism 144 is a computer, and operates in accordance with an installed program. The entirety or part of processing to be performed by the control computing mechanism 144, may be performed by an electronic circuit accompanying no program. The entirety or part of processing to be performed by the control computing mechanism 144, may be manually performed. The control computing mechanism 144 may be built in the spectral apparatus 100.

7. Wavelengths of Emission-Line Components

The light to be measured for emission-line calibration includes emission-line components 145-1, 145-2, 145-3, 145-4, 145-5, and 145-6, as illustrated in FIG. 5. The wavelengths of the emission-line components 145-1, 145-2, 145-3, 145-4, 145-5, and 145-6 are 404.55 nm, 435.84 nm, 508.58 nm, 546.07 nm, 578 nm, and 647.85 nm, respectively. The emission-line components 145-1, 145-2, 145-3, 145-4, 145-5, and 145-6 are used for the calibration of the spectral apparatus 100.

Emission-line components other than the emission-line components 145-1, 145-2, 145-3, 145-4, 145-5, and 145-6, may be used for the calibration of the spectral apparatus 100. Not more than five emission-line components or not less than seven emission-line components may be used for the calibration of the spectral apparatus 100. Light emitted from an emission-line light source other than the HgCd lamp 143, may be used as the light to be measured for emission-line calibration. Calibration not being emission-line calibration may be performed and light emitted from a light source not being an emission-line light source may be used as the light to be measured for calibration.

8. Models Used in Calibration of Spectral Apparatus

A first model, a second model, or a third model is used in the calibration of the spectral apparatus 100. The first model and the second model are exemplary references.

9. Indicator Indicating Spectral Sensitivity of Each Sensor

The sensors 119-1, 119-2, . . . , and 119-40 are identified with a position i in each of the first model, the second model, and the third model. The position i takes any of mutually different 40 values $i_1$, $i_2$, . . . , and $i_{40}$. The sensors 119-1, 119-2, . . . , and 119-40 may be identified by an indicator other than the position. For example, the sensors 119-1, 119-2, . . . , and 119-40 may be identified by the center wavelength in reference spectral sensitivity or pixel number.

In each of the first model, the second model, and the third model, the spectral sensitivity of the sensor at the position i is indicated with the center wavelength $\lambda_G(i)$ and the full width at half maximum FWHM(i) in the spectral sensitivity of the sensor at the position i. The center wavelength $\lambda_G(i)$ and the full width at half maximum FWHM(i) each are a function of the position i.

The spectral sensitivity of the sensor at the position i is favorably approximated by a Gaussian function having an independent variable in wavelength and a dependent variable in sensitivity. The shape of the Gaussian function is determined with the center wavelength and the full width at half maximum. Therefore, the center wavelength $\lambda_G(i)$ and the full width at half maximum FWHM(i) are preferable to an indicator indicating the spectral sensitivity of the sensor at the position i. Note that the indicator indicating the spectral sensitivity of the sensor at the position i may be changed. The indicator indicating the spectral sensitivity of the sensor at the position i, is allowed to have one variable or not less than three variables.

10. First Model (Exemplary Reference)

In a case where the first model is used, Expression (1) in which the center wavelength $\lambda_G(i)$ is expressed by an n-th order function of the position i, is created.

[Mathematical Formula 1]

$$\lambda_G(i)=f_1(i)=a_n \cdot i^n + \ldots + a_0 \quad (1)$$

Expression (2) in which the full width at half maximum FWHM(i) is expressed by an m-th order function of the position i, is created.

[Mathematical Formula 2]

$$FWHM(i)=f_2(i)=b_m \cdot i^m + \ldots + b_0 \quad (2)$$

The first model includes Expression (1) and Expression (2). Coefficients $a_n$ to $a_0$ are explanatory variables, and are calibration parameters that determine the spectral sensitivity of the sensor at the position i. Coefficients $b_n$ to $b_0$ are explanatory variables, and are calibration parameters that determine the spectral sensitivity of the sensor at the position i.

In a case where the calibration of the spectral apparatus 100 is performed with the first model, the coefficients $a_n$ to $a_0$ and the coefficients $b_n$ to $b_0$ are acquired to adapt a spectral sensitivity set for a set of two sensors or more in the spectral sensitivity of the sensor indicated with the center wavelength $\lambda_G(i)$ and the full width at half maximum FWHM(i), to a signal set for the set of two sensors or more in the signal output from the sensor.

Subsequently, the center wavelength $\lambda_G(i)$ is acquired with Expression (1) that has been created and the coefficients $a_n$ to $a_0$ that have been acquired, and the full width at half maximum FWHM(i) is acquired with Expression (2) that has been created and the coefficients $b_n$ to $b_0$ that have been acquired.

Subsequently, the spectral sensitivity of the sensor at the position i is acquired with the center wavelength $\lambda_G(i)$ and the full width at half maximum FWHM(i) that have been acquired. The spectral sensitivity of the sensor at the position i is the spectral sensitivity indicated with the center wavelength $\lambda_G(i)$ and the full width at half maximum FWHM(i) that have been acquired.

In the case where the calibration of the spectral apparatus 100 is performed with the first model, the spectral sensitivity is precisely acquired in wavelength regions close to any of the wavelengths $\lambda_{HgCd}(1)$, $\lambda_{HgCd}(2)$, . . . , and $\lambda_{HgCd}(K_0)$ of the emission-line components, but the spectral sensitivity is not precisely acquired in the other wavelength regions. Particularly, the spectral sensitivity is not precisely acquired in wavelength regions on the shortest wavelength side and on the longest wavelength side.

11. Second Model (Exemplary Reference)

The second model is provided to solve the problem in the first model.

In a case where the second model is used, an ideal spectral apparatus 100 including, for example, the arrangements, shapes, and sizes of the slit plate 115, the concave diffraction grating 116, and the linear array sensor 112 as designed, is assumed, and the reference spectral sensitivity of the sensor at the position i included in the spectral apparatus 100 that has been assumed, is acquired by optical simulation. The reference spectral sensitivity of the sensor at the position i is a function of the position i.

Subsequently, the center wavelength $\lambda_{G0}(i)$ and the full width at half maximum $FWHM_0(i)$ in the reference spectral sensitivity of the sensor at the position i are acquired.

The center wavelength $\lambda_{G0}(i)$ and the full width at half maximum $FWHM_0(i)$ are preferable to an indicator indicating the reference spectral sensitivity of the sensor at the position i.

Subsequently, Expression (3) in which the deviation $\Delta\lambda_G(i)$ of the center wavelength $\lambda_G(i)$ from the center wavelength $\lambda_{G0}(i)$ is expressed by a linear function of the position i, is created.

[Mathematical Formula 3]

$$\Delta\lambda_G(i)=\lambda_G(i)-\lambda_{G0}(i)=a_1 \cdot i+a_0 \quad (3)$$

Expression (4) in which the ratio ratio(i) of the full width at half maximum FWHM(i) to the full width at half maximum $FWHM_0(i)$ is expressed by a linear function of the position i, is created.

[Mathematical Formula 4]

$$\text{ratio}(i) = \frac{FWHM(i)}{FWHM_0(i)} = b_1 \cdot i + b_0 \quad (4)$$

The second model includes Expression (3) and Expression (4). Coefficients $a_1$ and $a_0$ are explanatory variables, and are calibration parameters that determine the spectral sensitivity of the sensor at the position i. Coefficients $b_1$ and $b_0$ are explanatory variables, and are calibration parameters that determine the spectral sensitivity of the sensor at the position i.

The center wavelength $\lambda_G(i)$ is acquired with Expression (5) derived from Expression (3).

[Mathematical Formula 5]

$$\lambda_G(i)=\lambda_{G0}(i)+a_1 \cdot i+a_0 \quad (5)$$

In a case where the calibration of the spectral apparatus 100 is performed with the second model, the coefficients $a_1$ and $a_0$ and the coefficients $b_1$ and $b_0$ are acquired to adapt a spectral sensitivity set for a set of two sensors or more in the spectral sensitivity of the sensor indicated with the center wavelength $\lambda_G(i)$ and the full width at half maximum FWHM(i), to a signal set for the set of two sensors or more in the signal output from the sensor.

Subsequently, the deviation $\Delta\lambda_G(i)$ is acquired with Expression (3) that has been created and the coefficients $a_1$ and $a_0$ that have been acquired, and the ratio ratio(i) is acquired with Expression (4) that has been created and the coefficients $b_1$ and $b_0$ that have been acquired.

Subsequently, the spectral sensitivity of the sensor at the position i is acquired with the deviation $\Delta\lambda_G(i)$ and the ratio ratio(i) that have been acquired.

Figure 6:
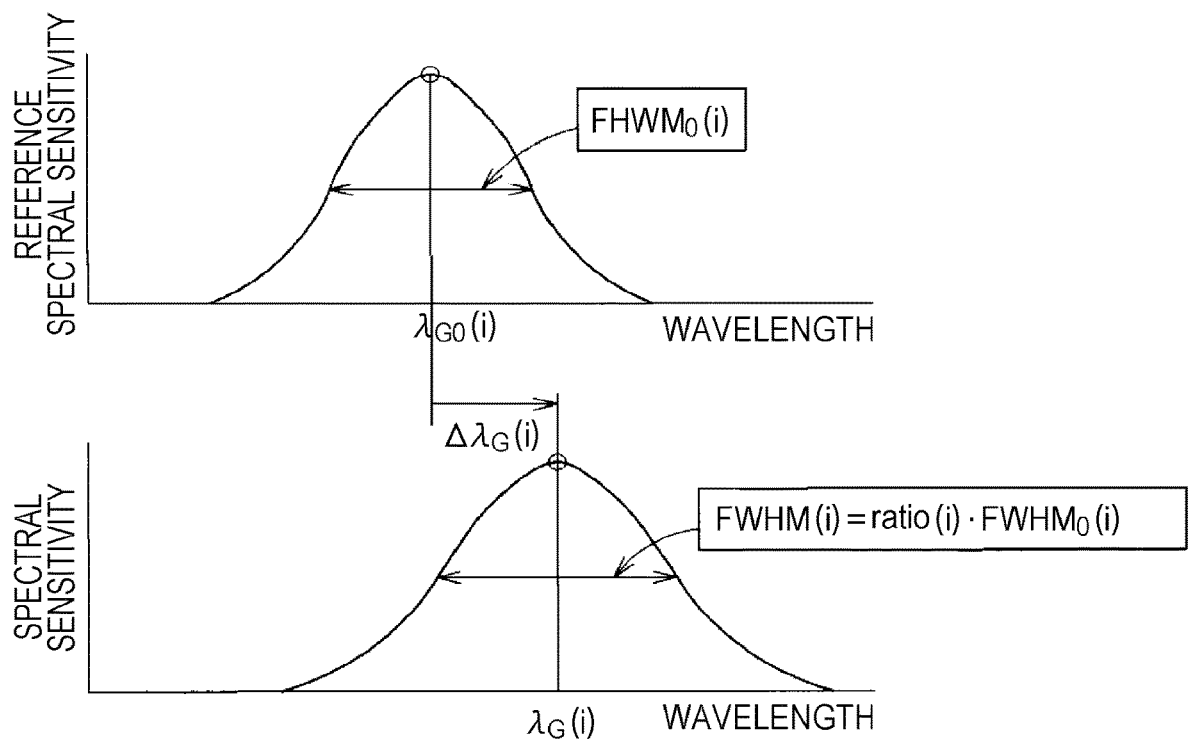
FIG. 6 is a schematic graphical representation of the relationship between reference spectral sensitivity and spectral sensitivity after calibration.

The schematic graphical representation of FIG. 6 illustrates the relationship between the reference spectral sensitivity of the sensor at the position i and the spectral sensitivity of the sensor at the position i.

As illustrated in FIG. 6, the spectral sensitivity of the sensor at the position i is acquired by enlarging the reference spectral sensitivity of the sensor at the position i ratio(i) times along the wavelength axis, with the center wavelength $\lambda_{G0}(i)$ centered, and moving the reference spectral sensitivity that has been enlarged, by $\Delta\lambda_G(i)$ along the wavelength axis.

Figure 7:
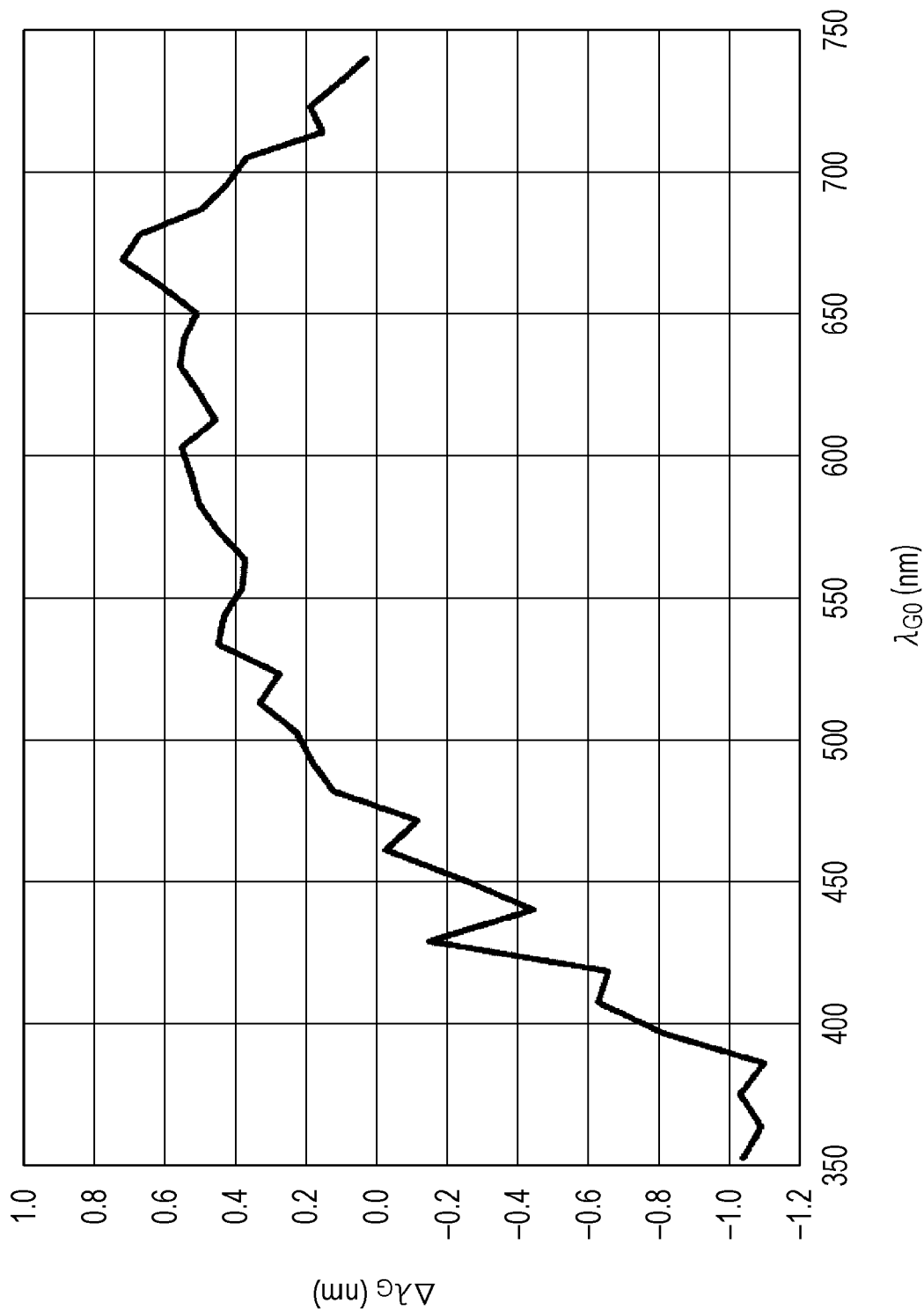
FIG. 7 is a graph of the relationship between the center wavelength in reference spectral sensitivity and the deviated amount of the center wavelength.

The graph of FIG. 7 illustrates measured data indicating the relationship between the center wavelength $\lambda_{G0}$ in the reference spectral sensitivity and the deviation $\Delta\lambda_G$ in the spectral apparatus 100 in practice. The graph of FIG. 8 illustrates measured data indicating the relationship between the center wavelength $\lambda_{G0}$ in the reference spectral sensitivity and the ratio in the spectral apparatus 100 in practice.

Figure 8:
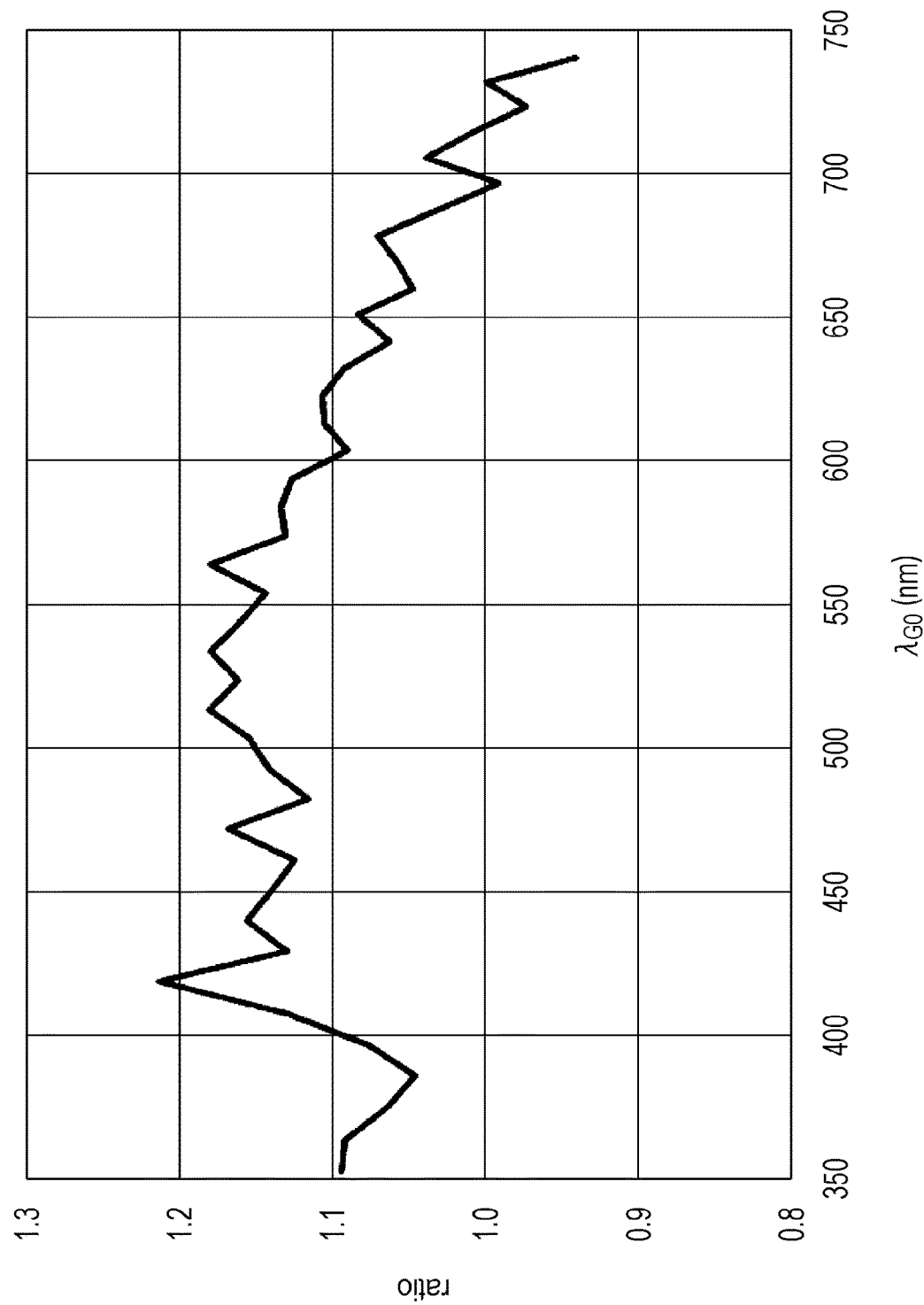
FIG. 8 is a graph of the relationship between the center wavelength in the reference spectral sensitivity and the ratio in full width at half maximum.

In the spectral apparatus 100 in practice, as illustrated in FIG. 7, it cannot necessarily be said that the deviation $\Delta\lambda_G$ is a linear function of the center wavelength $\lambda_{G0}$ in the reference spectral sensitivity, and, as illustrated in FIG. 8, it cannot necessarily be said that the ratio is a linear function of the center wavelength $\lambda_{G0}$. In such cases, Expression (3) and Expression (4) each are not favorable approximation. Therefore, in the case where the calibration of the spectral apparatus 100 is performed with the second model, the spectral sensitivity is not necessarily acquired precisely.

In a case where the deviation $\Delta\lambda_G(i)$ is expressed by a higher order function being a quadratic function of the position i or more and the ratio ratio(i) is expressed by a higher order function being a quadratic function of the position i or more in order to solve the problem, the adaptability of the spectral sensitivity set to the signal set greatly varies when the coefficients $a_1$, $a_0$, $b_1$, and $b_0$ vary. Therefore, the coefficients $a_1$, $a_0$, $b_1$, and $b_0$ are not necessarily acquired appropriately.

12. Third Model 12.1 Creation of Third Model

The third model is provided in order to solve the problem in the second model.

Figure 9:
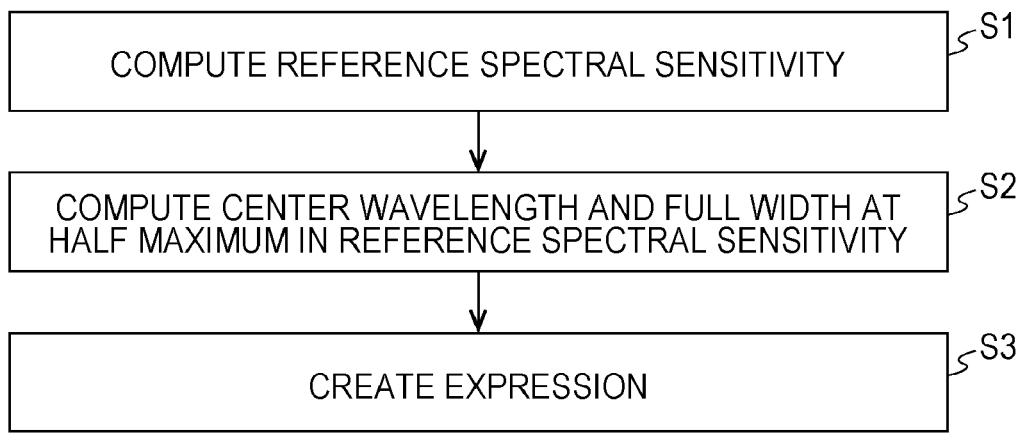
FIG. 9 is a flowchart of a procedure of creating a third model.

The flowchart of FIG. 9 illustrates a procedure of creating the third model.

Even in a case where the calibration of the spectral apparatus 100 is performed for each of a plurality of spectral apparatuses, the procedure indicated at steps S1 and S2 of FIG. 9 is not required to be performed for each of the plurality of spectral apparatuses, and thus the procedure at steps S1 and S2 illustrated in FIG. 9 is required at least to be performed previously once. Note that, the procedure illustrated in FIG. 9 may be performed again and the third model may be recreated during the performance of the calibration of the spectral apparatus 100 for each of the plurality of spectral apparatuses.

In a case where the third model is created, at step S, an ideal spectral apparatus 100 including, for example, the arrangements, shapes, and sizes of the slit plate 115, the concave diffraction grating 116, and the linear array sensor 112 as designed, is assumed, and the reference spectral sensitivity of the sensor at the position i included in the spectral apparatus 100 that has been assumed, is acquired by optical simulation. The reference spectral sensitivity of the sensor at the position i is a function of position i. Therefore, at step S1, the reference spectral sensitivity of the sensor is acquired for each of the sensor at the position $i_1$, the sensor at the position $i_2$, ..., and the sensor at the position $i_{40}$.

Subsequently, at step S2, the center wavelength $\lambda_{G0}(i)$ and the full width at half maximum $FWHM_0(i)$ in the reference spectral sensitivity of the sensor at the position i are acquired. The center wavelength $\lambda_{G0}(i)$ and the full width at half maximum $FWHM_0(i)$ each are a function of the position i. Therefore, at step S2, the center wavelength and the full width at half maximum in the reference spectral sensitivity of the sensor are acquired for each of the sensor at the position $i_1$, the sensor at the position $i_2$, ..., and the sensor at the position $i_{40}$.

The center wavelength $\lambda_{G0}(i)$ and the full width at half maximum $FWHM_0(i)$ are preferable to an indicator indicating the reference spectral sensitivity of the sensor at the position i.

Subsequently, at step S3, Expression (6) in which the deviation of the wavelength $\lambda_G(i)$ from the center wavelength $\lambda_{G0}(i)$ is expressed by linear functions of arrangement errors $a_1$, $a_2$, and $a_3$ of the linear array sensor 112, a manufacturing error $a_4$ in the width of the slit 122, and an arrangement error as of the concave diffraction grating 116, is created. Expression (7) in which the deviation of the full width at half maximum FWHM(i) from the full width at half maximum $FWHM_0(i)$ is expressed by linear functions of the arrangement errors $a_1$, $a_2$, and $a_3$ of the linear array sensor 112, the manufacturing error $a_4$ in the width of the slit 122, and the arrangement error as of the concave diffraction grating 116, is created. The center wavelength $\lambda_{G0}(i)$ and the full width at half maximum $FWHM_0(i)$ each are a function of the position i. The errors $a_1$, $a_2$, $a_3$, $a_4$, and as are included in an indicator indicating a mechanical error in the spectral apparatus 100. Therefore, at step S3, the third model in which the deviation of the indicator indicating the spectral sensitivity of the sensor from the indicator indicating the reference spectral sensitivity of the sensor is expressed by a linear function of the indicator indicating the mechanical error in the spectral apparatus 100, is created for each of the sensor at the position $i_1$, the sensor at the position $i_2$, ..., and the sensor at the position $i_{40}$.

[Mathematical Formula 6]

$$\lambda_G(i) = \lambda_{G0}(i) + a_1 \cdot \delta\lambda_{G1}(i) + a_2 \cdot \delta\lambda_{G2}(i) + a_3 \cdot \delta\lambda_{G3}(i) + a_4 \cdot \delta\lambda_{G4}(i) + a_5 \cdot \delta\lambda_{G5}(i) \quad (6)$$

[Mathematical Formula 7]

$$FWHM(i) = FWHM_0(i) + a_1 \cdot \delta FWHM_1(i) + a_2 \cdot \delta FWHM_2(i) + a_3 \cdot \delta FWHM_3(i) + a_4 \cdot \delta FWHM_4(i) + a_5 \cdot \delta FWHM_5(i) \quad (7)$$

The third model includes Expression (6) and Expression (7). The errors $a_1$, $a_2$, $a_3$, $a_4$, and as are explanatory variables, and are calibration parameters that determine the spectral sensitivity of the sensor at the position i.

The arrangement error $a_1$ of the linear array sensor 112 is an arrangement error of the linear array sensor 112 in the direction 128 in which the sensors 119-1, 119-2, ..., and 119-40 are arranged. The arrangement error $a_2$ of the linear array sensor 112 is an arrangement error of the linear array sensor in a direction 129 in which the optical axis 135 extends. The arrangement error $a_3$ of the linear array sensor 112 is a turn error in the circumferential direction 130 of an axis 130c of the sensor orthogonal to the direction 128 and the optical axis 135. The manufacturing error $a_4$ in the width of the slit 122 is a manufacturing error in the width of the slit 122 in a direction 131 parallel to a principal section 146 of the concave diffraction grating 116 and perpendicular to the optical axis 134. The arrangement error $a_5$ is a turn error in the circumferential direction 132 of an axis 132c of the concave diffraction grating 116. The principal section 146 of the concave diffraction grating 116 is a plane perpendicular to ruled lines formed on the diffraction surface 124.

Since the errors $a_1$, $a_2$, $a_3$, $a_4$, and $a_5$ are expected to be small, expressing the deviation of the center wavelength $\lambda_G(i)$ from the wavelength $\lambda_{G0}(i)$ by the linear functions of the errors $a_1$, $a_2$, $a_3$, $a_4$, and $a_5$ is favorable approximation, and expressing the deviation of the full width at half maximum FWHM(i) from the full width at half maximum $FWHM_0(i)$ by the linear functions of the errors $a_1$, $a_2$, $a_3$, $a_4$, and $a_5$ is also favorable approximation. Therefore, in a case where the calibration of the spectral apparatus 100 is performed with the third model, the spectral sensitivity is precisely acquired.

The errors $a_1$, $a_2$, $a_3$, $a_4$, and $a_5$ have large influence on the center wavelength $\lambda_G(i)$ or the full width at half maximum FWHM(i), and have large influence on the spectral sensitivity of the sensor at the position i. Therefore, the errors $a_1$, $a_2$, $a_3$, $a_4$, and $a_5$ are preferable to the indicator indicating the mechanical error in the spectral apparatus 100. Note that the indicator indicating the mechanical error in the spectral apparatus 100 may be changed. The number of the explanatory variables or the calibration parameters included in the indicator indicating the mechanical error in the spectral apparatus 100, is limited not more than the number of the emission-line components included in the light to be measured for emission-line calibration, but may be not more than four or not less than six.

In the linear functions of the errors $a_1$, $a_2$, $a_3$, $a_4$, and $a_5$ included in Expression (6), the errors $a_1$, $a_2$, $a_3$, $a_4$, and $a_5$ are multiplied by coefficients $\delta\lambda_{G1}(i)$, $\delta\lambda_{G2}(i)$, $\delta\lambda_{G3}(i)$, $\delta\lambda_{G4}(i)$, and $\delta\lambda_{G5}(i)$, respectively. The coefficients $\delta\lambda_{G1}(i)$, $\delta\lambda_{G2}(i)$, $\delta\lambda_{G3}(i)$, $\delta\lambda_{G4}(i)$, and $\delta\lambda_{G5}(i)$ are the deviated amounts of the center wavelength $\lambda_G(i)$ in a case where the errors $a_1$, $a_2$, $a_3$, $a_4$, and $a_5$ occur in unit amounts, respectively, and are acquired by optical simulation. The coefficients $\delta\lambda_{G1}(i)$, $\delta\lambda_{G2}(i)$, $\delta\lambda_{G3}(i)$, $\delta\lambda_{G4}(i)$, and $\delta\lambda_{G5}(i)$ each are a function of the position i.

In the linear functions of the errors $a_1$, $a_2$, $a_3$, $a_4$, and as included in Expression (7), the errors $a_1$, $a_2$, $a_3$, $a_4$, and as are multiplied by coefficients $\delta FWHM_1(i)$, $\delta FWHM_2(i)$, $\delta FWHM_3(i)$, $\delta FWHM_4(i)$, and $\delta FWHM_5(i)$, respectively (added and subtracted). The coefficients $\delta FWHM_1(i)$, $\delta FWHM_2(i)$, $\delta FWHM_3(i)$, $\delta FWHM_4(i)$, and $\delta FWHM(i)$ are the deviated amounts of the full width at half maximum FWHM(i) in a case where the errors $a_1$, $a_2$, $a_3$, $a_4$, and as occur in unit amounts, respectively, and are acquired by optical simulation. The coefficients $\delta FWHM_1(i)$, $\delta FWHM_2(i)$, $\delta FWHM_3(i)$, $\delta FWHM_4(i)$, and $\delta FWHM(i)$ each are a function of the position i.

Channels Ch in each of FIGS. 10 to 19 represent the identification numbers of the sensors 119-1, 119-2, ..., and 119-40.

Figure 10:
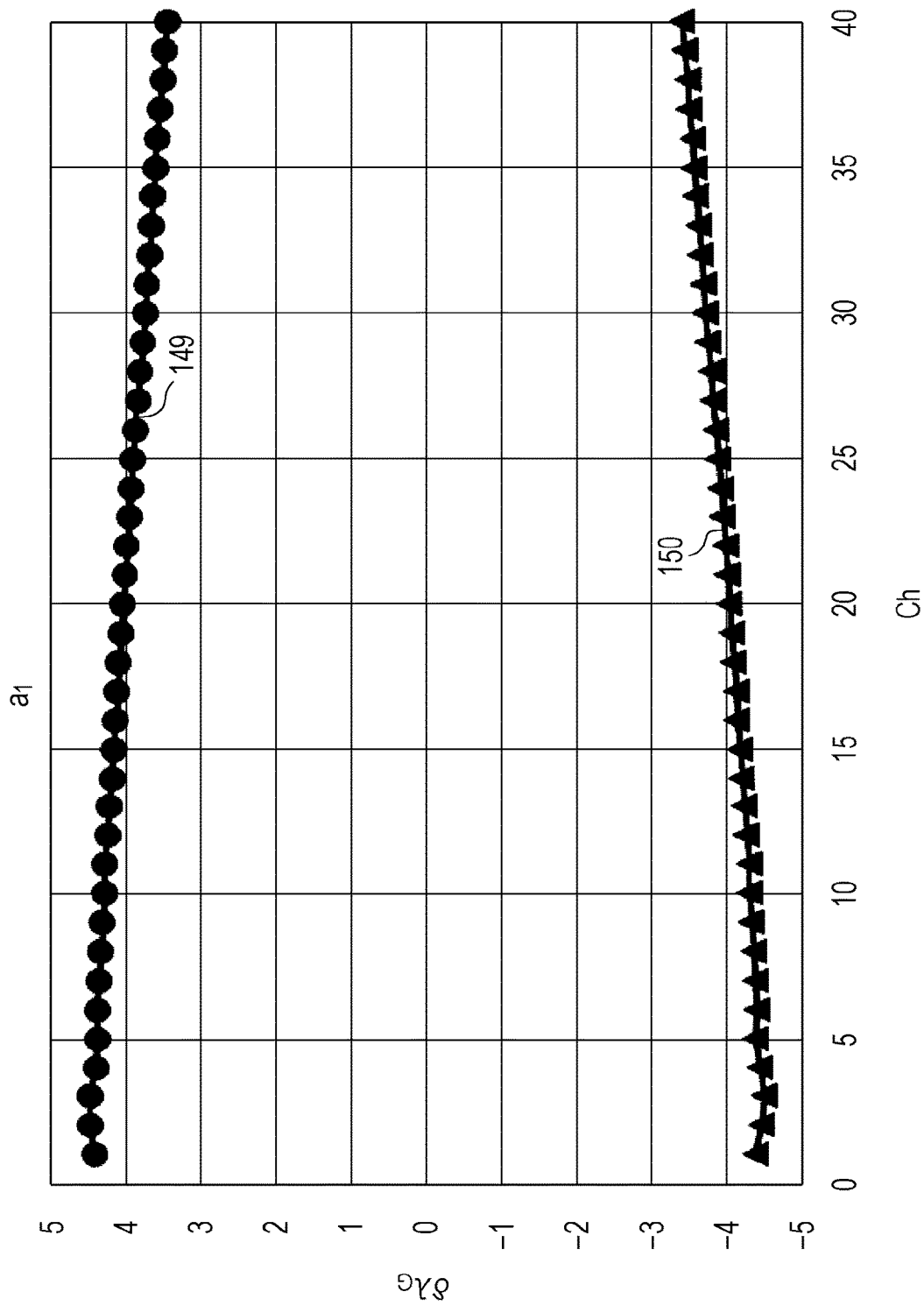
FIG. 10 is a graph of deviated amount of the center wavelength in the channel of each sensor, the deviated amount being caused by a mechanical error a1.

Reference numeral 149 of FIG. 10 represents the deviated amount $\delta\lambda_G$ of the center wavelength in the spectral sensitivity of each channel Ch in a case where the arrangement error $a_1$ is deviated from 0 by +1 unit, and reference numeral 150 represents the deviated amount $\delta\lambda_G$ of the center wavelength in the spectral sensitivity of each channel Ch in a case where the arrangement error $a_1$ is deviated from 0 by −1 unit. Relationships 149 and 150 are acquired by optical simulation. The coefficient $\delta\lambda_{G1}(i)$ is, for example, acquired with relationships 149 and 150.

Figure 11:
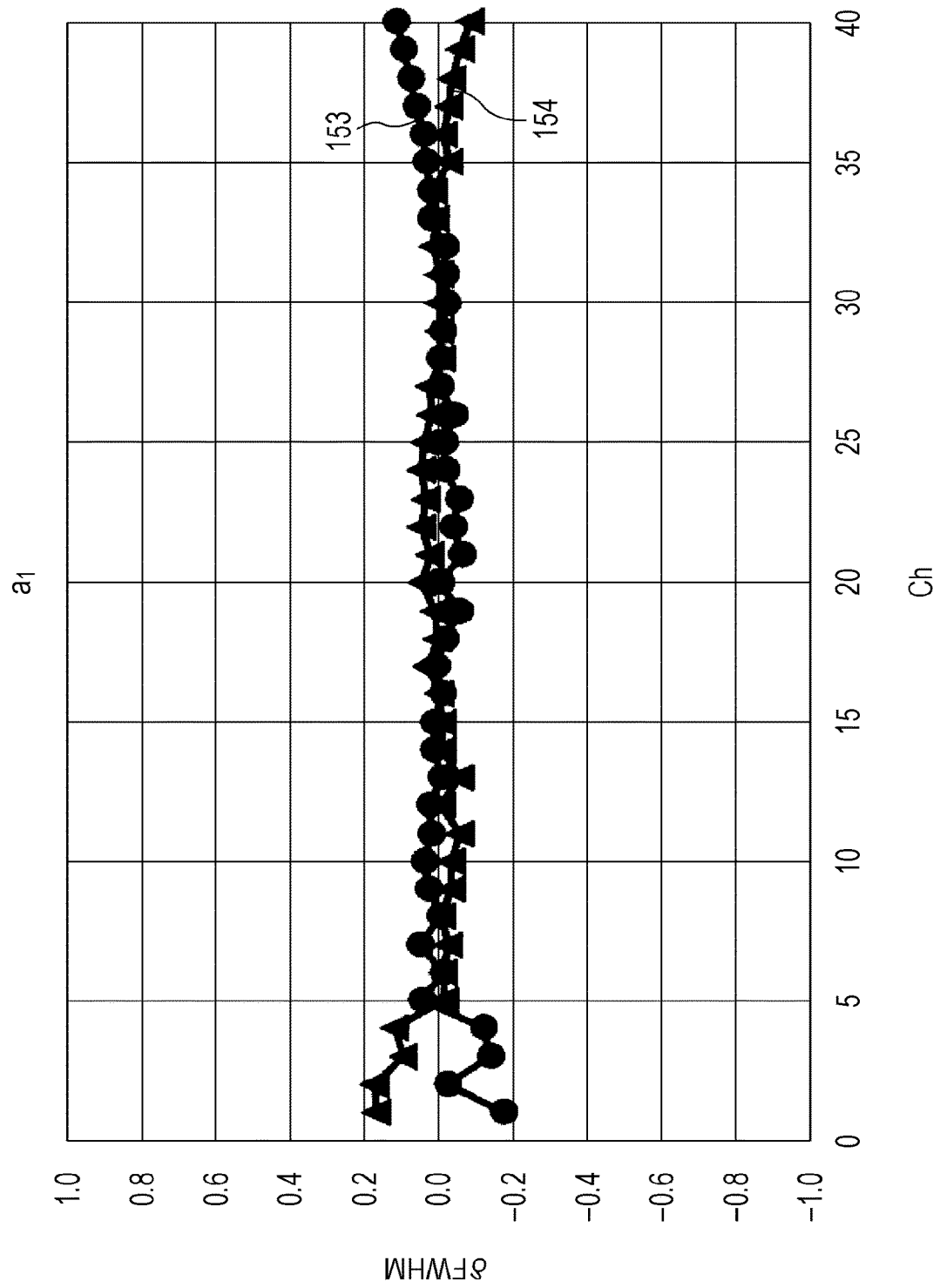
FIG. 11 is a graph of deviated amount of the full width at half maximum in the channel of each sensor, the deviated amount being caused by the mechanical error a1.

Reference numeral 153 of FIG. 11 represents the deviated amount $\delta FWHM$ of the full width at half maximum in the spectral sensitivity of the channel Ch of each of the sensors in a case where the arrangement error $a_1$ is deviated from 0 by +1 unit, and reference numeral 154 represents the deviated amount $\delta FWHM$ of the full width at half maximum in the spectral sensitivity of the channel Ch of each of the sensors in a case where the arrangement error $a_1$ is deviated from 0 by −1 unit. Relationships 153 and 154 are acquired by optical simulation. The coefficient $\delta FWHM_1(i)$ is, for example, acquired with relationships 153 and 154.

Figure 12:
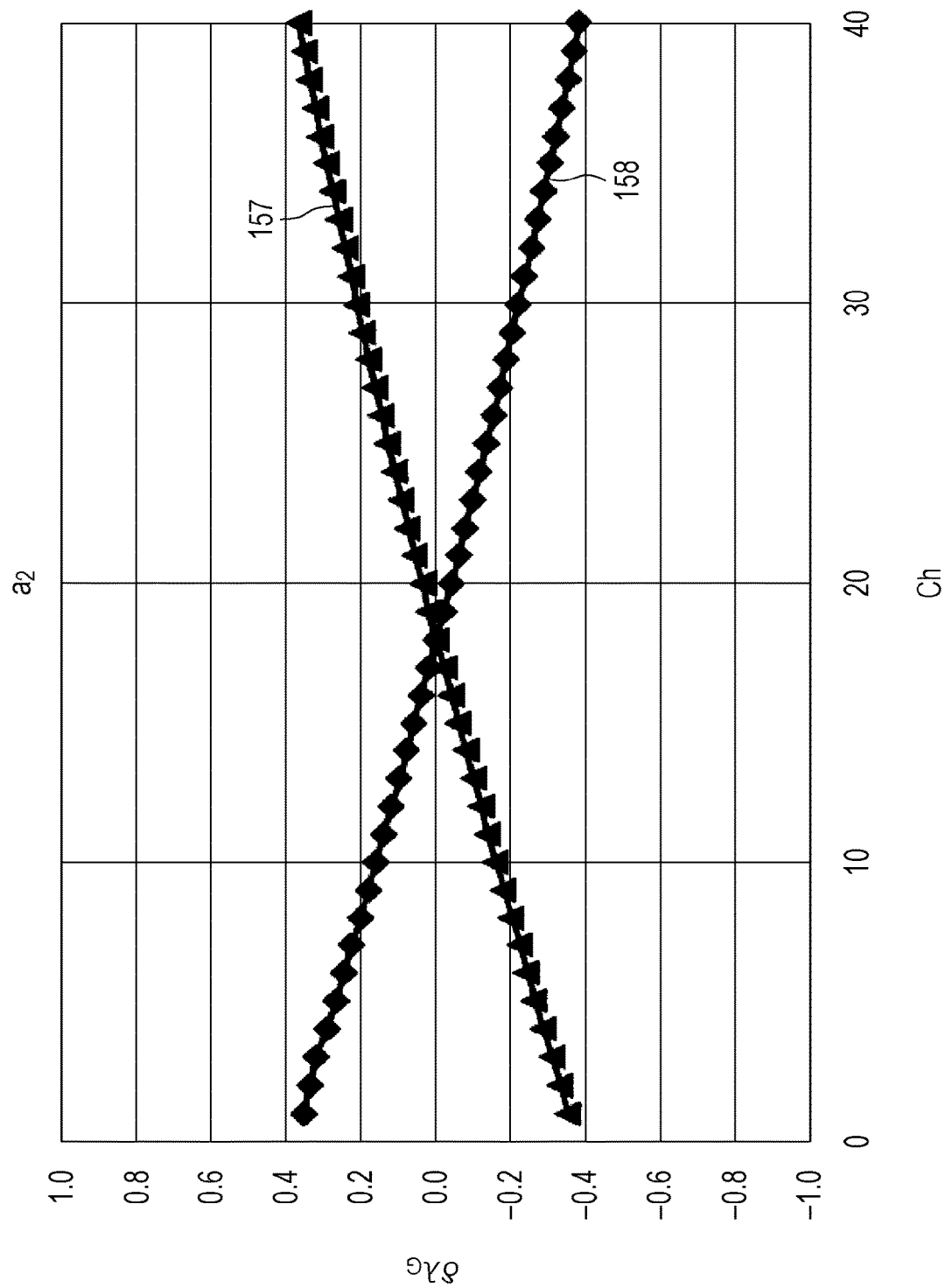
FIG. 12 is a graph of deviated amount of the center wavelength in the channel of each sensor, the deviated amount being caused by a mechanical error a2.

Reference numeral 157 of FIG. 12 represents the deviated amount $\delta\lambda_G$ of the center wavelength in the spectral sensitivity of each channel Ch in a case where the arrangement error $a_2$ is deviated from 0 by +1 unit, and reference numeral 158 represents the deviated amount $\delta\lambda_G$ of the center wavelength in the spectral sensitivity of each channel Ch in a case where the arrangement error $a_2$ is deviated from 0 by −1 unit. Relationships 157 and 158 are acquired by optical simulation. The coefficient $\delta\lambda_{G2}(i)$ is, for example, acquired with relationships 157 and 158.

Figure 13:
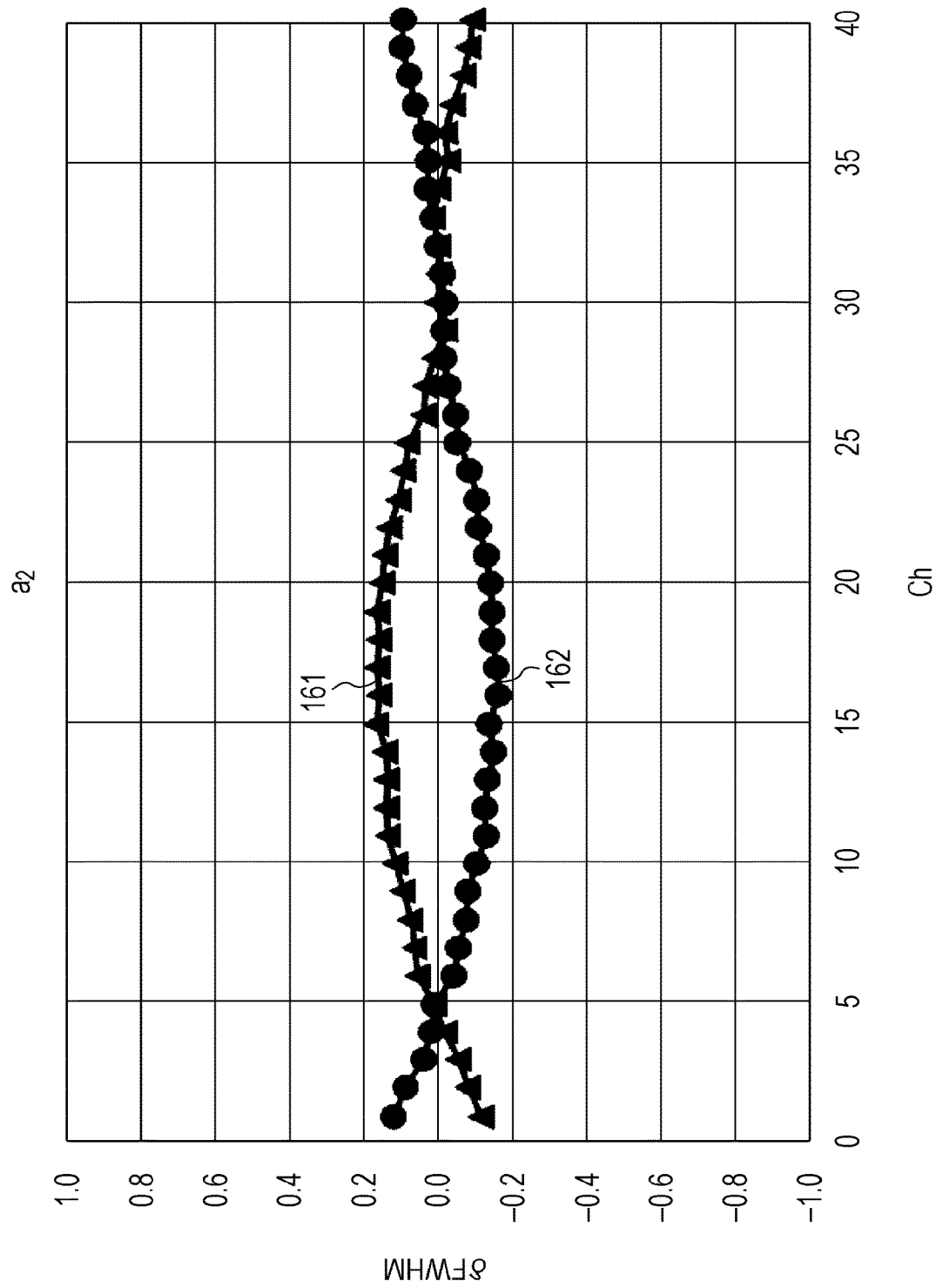
FIG. 13 is a graph of deviated amount of the full width at half maximum in the channel of each sensor, the deviated amount being caused by the mechanical error a2.

Reference numeral 161 of FIG. 13 represents the deviated amount $\delta FWHM$ of the full width at half maximum in the spectral sensitivity of the channel Ch of each of the sensors in a case where the arrangement error $a_2$ is deviated from 0 by +1 unit, and reference numeral 162 represents the deviated amount $\delta FWHM$ of the full width at half maximum in the spectral sensitivity of the channel Ch of each of the sensors in a case where the arrangement errors $a_2$ is deviated from 0 by −1 unit. Relationships 161 and 162 are acquired by optical simulation. The coefficient $\delta FWHM_2(i)$ is, for example, acquired with relationships 161 and 162.

Figure 14:
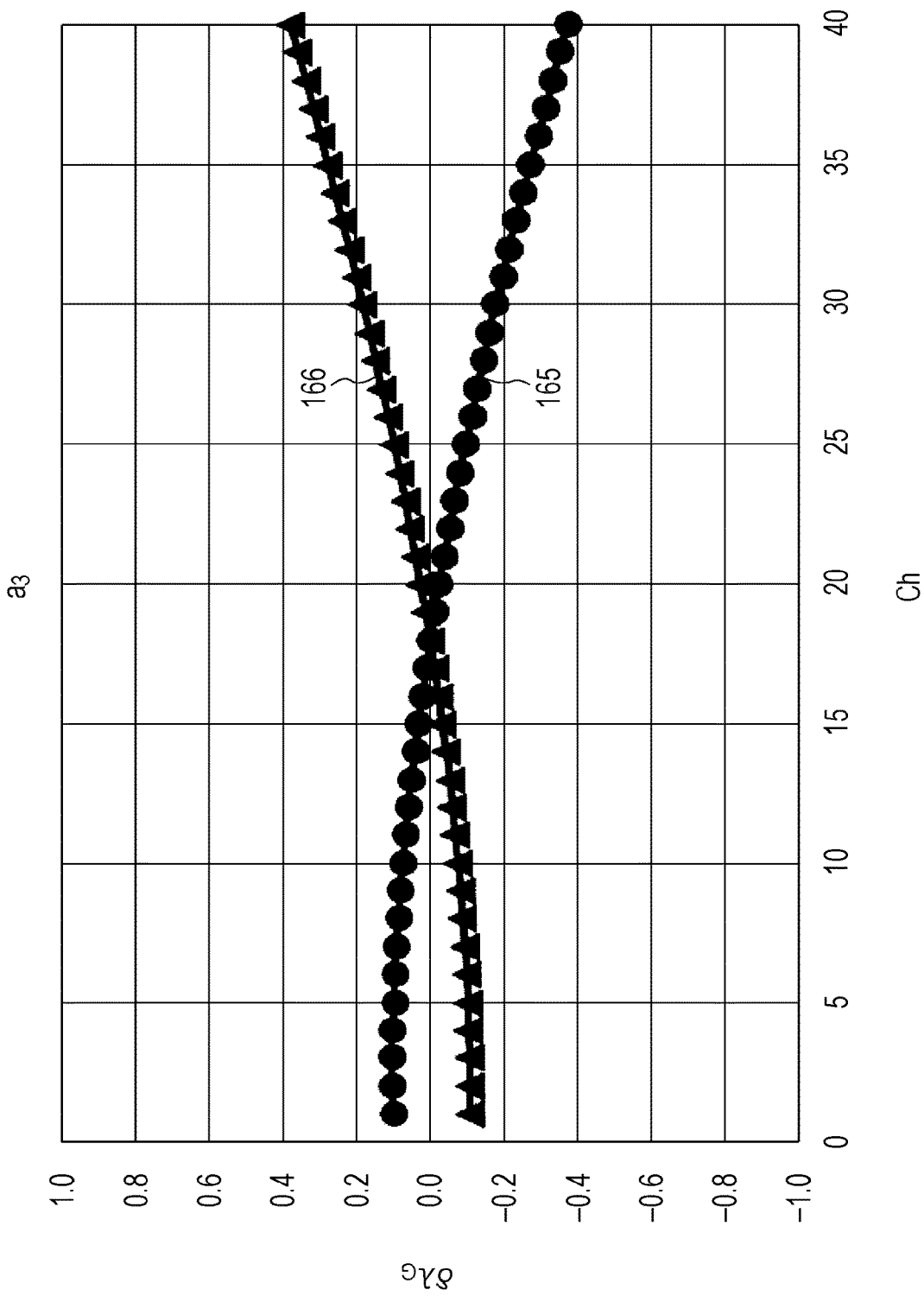
FIG. 14 is a graph of deviated amount of the center wavelength in the channel of each sensor, the deviated amount being caused by a mechanical error a3.

Reference numeral 165 of FIG. 14 represents the deviated amount $\delta\lambda_G$ of the center wavelength in the spectral sensitivity of each channel Ch in a case where the arrangement error $a_3$ is deviated from 0 by +1 unit, and reference numeral 166 represents the deviated amount $\delta\lambda_G$ of the center wavelength in the spectral sensitivity of each channel Ch in a case where the arrangement error $a_3$ is deviated from 0 by −1 unit. Relationships 165 and 166 are acquired by optical simulation. The coefficient $\delta\lambda_{G3}(i)$ is, for example, acquired with relationships 165 and 166.

Figure 15:
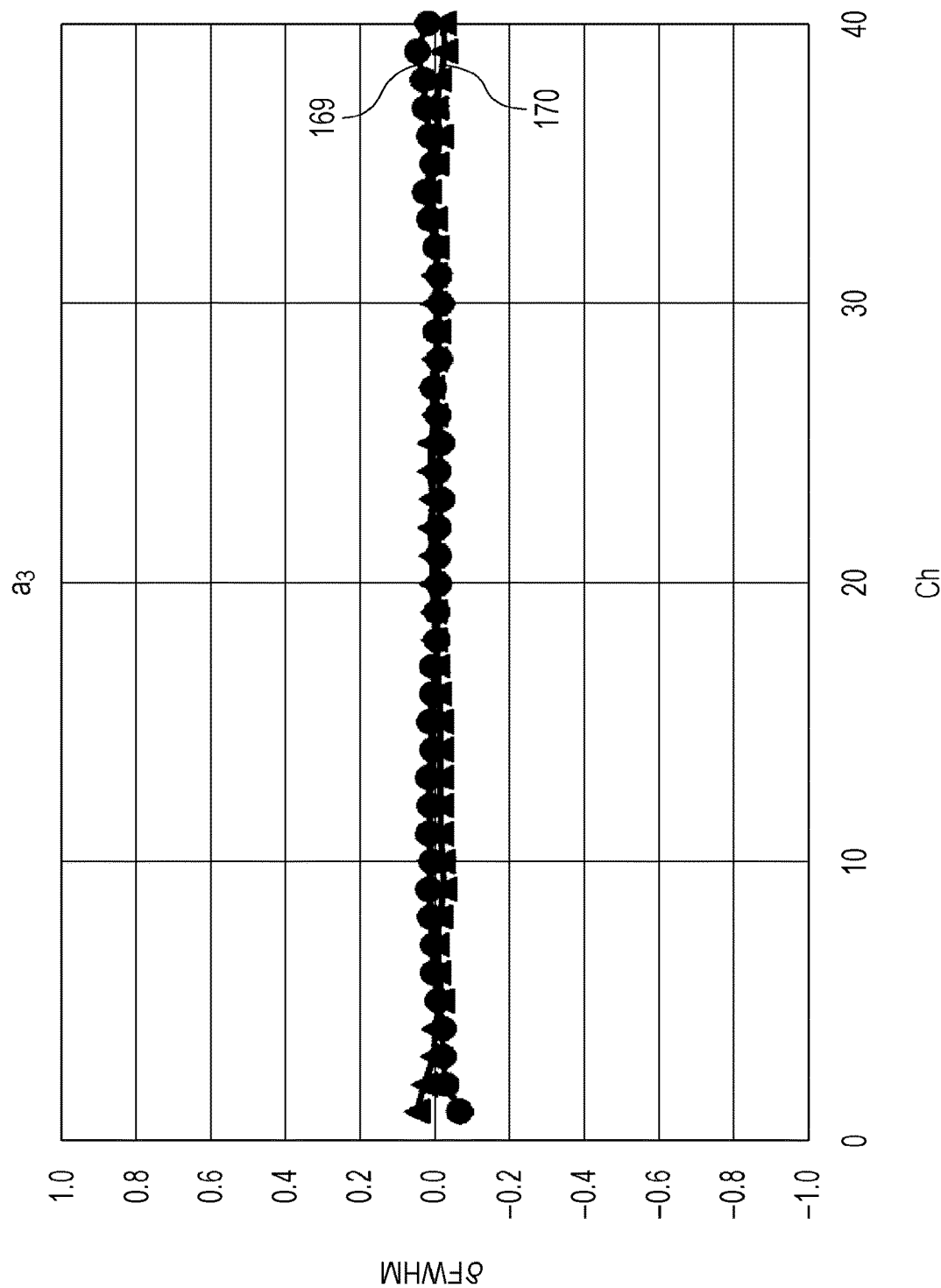
FIG. 15 is a graph of deviated amount of the full width at half maximum in the channel of each sensor, the deviated amount being caused by the mechanical error a3.

Reference numeral 169 of FIG. 15 represents the deviated amount $\delta FWHM$ of the full width at half maximum in the spectral sensitivity of the channel Ch of each of the sensors in a case where the arrangement error $a_3$ is deviated from 0 by +1 unit, and reference numeral 170 represents the deviated amount $\delta FWHM$ of the full width at half maximum in the spectral sensitivity of the channel Ch of each of the sensors in a case where the arrangement errors $a_3$ is deviated from 0 by −1 unit. Relationships 169 and 170 are acquired by optical simulation. The coefficient $\delta FWHM_3(i)$ is, for example, acquired with relationships 169 and 170.

Figure 16:
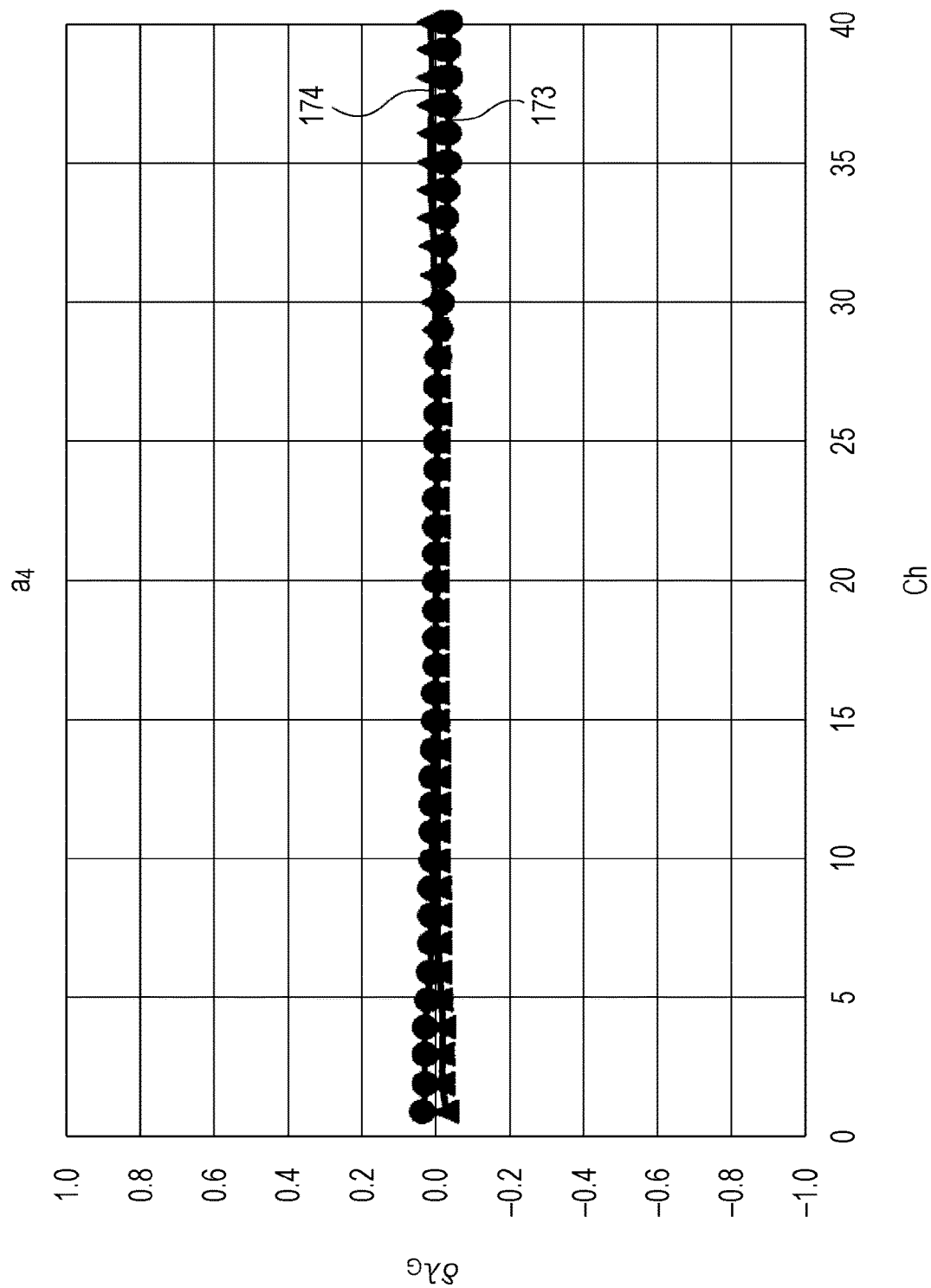
FIG. 16 is a graph of deviated amount of the center wavelength in the channel of each sensor, the deviated amount being caused by a mechanical error a4.

Reference numeral 173 of FIG. 16 represents the deviated amount $\delta\lambda_G$ of the center wavelength in the spectral sensitivity of each channel Ch in a case where the manufacturing error $a_4$ is deviated from 0 by +1 unit, and reference numeral 174 represents the deviated amount $\delta\lambda_G$ of the center wavelength in the spectral sensitivity of each channel Ch in a case where the manufacturing error $a_4$ is deviated from 0 by −1 unit. Relationships 173 and 174 are acquired by optical simulation. The coefficient $\delta\lambda_{G4}(i)$ is, for example, acquired with relationships 173 and 174.

Figure 17:
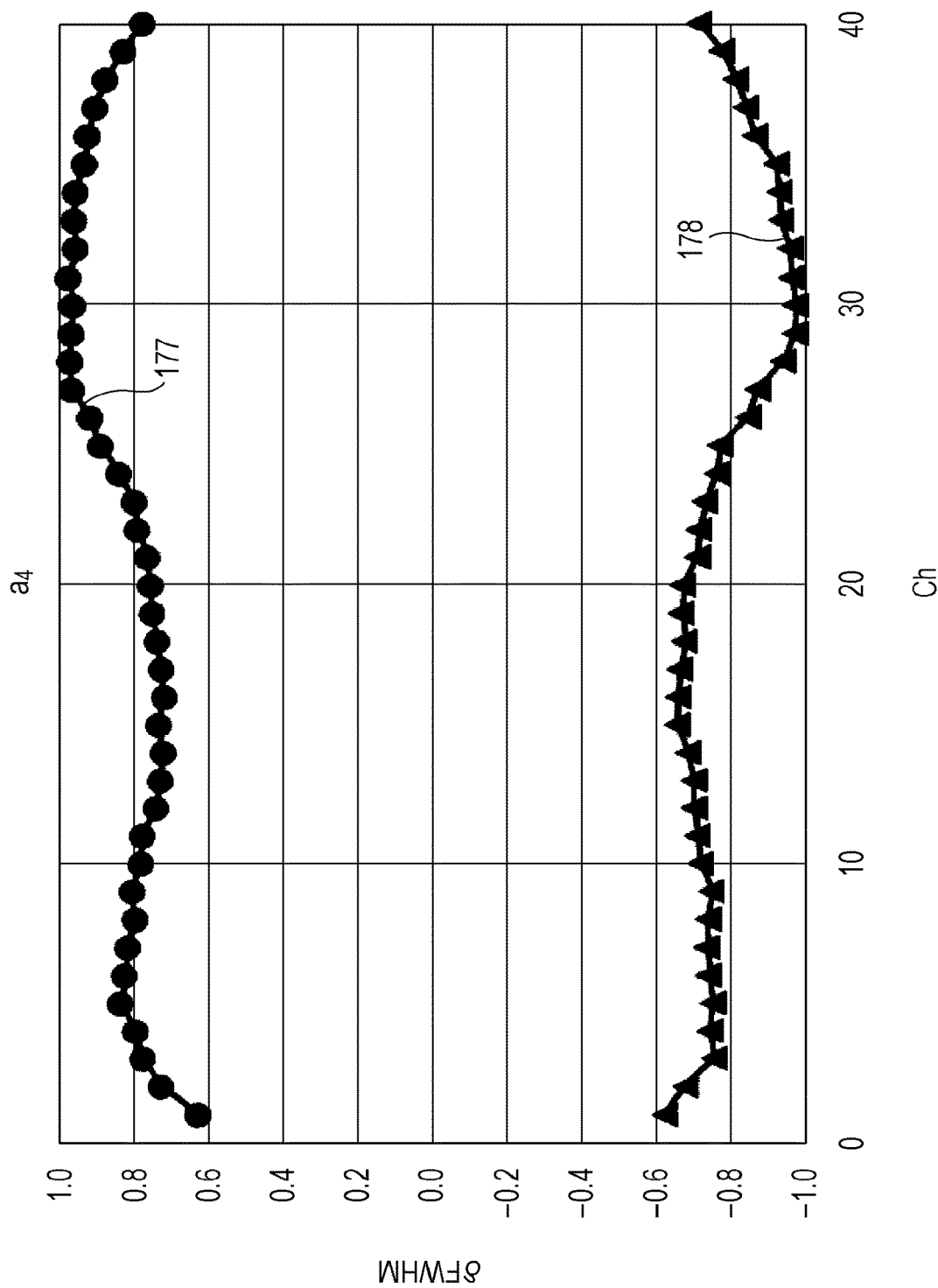
FIG. 17 is a graph of deviated amount of the full width at half maximum in the channel of each sensor, the deviated amount being caused by the mechanical error a4.

Reference numeral 177 of FIG. 17 represents the channel Ch of the deviated amount $\delta FWHM$ of the full width at half maximum in the spectral sensitivity of the channel Ch of each of the sensors in a case where the manufacturing error $a_4$ is deviated from 0 by +1 unit, and reference numeral 178 represents the deviated amount $\delta FWHM$ of the full width at half maximum in the spectral sensitivity of the channel Ch of each of the sensors in a case where the manufacturing errors $a_4$ is deviated from 0 by −1 unit. Relationships 177 and 178 are acquired by optical simulation. The coefficient $\delta FWHM_4(i)$ is, for example, acquired with relationships 177 and 178.

Figure 18:
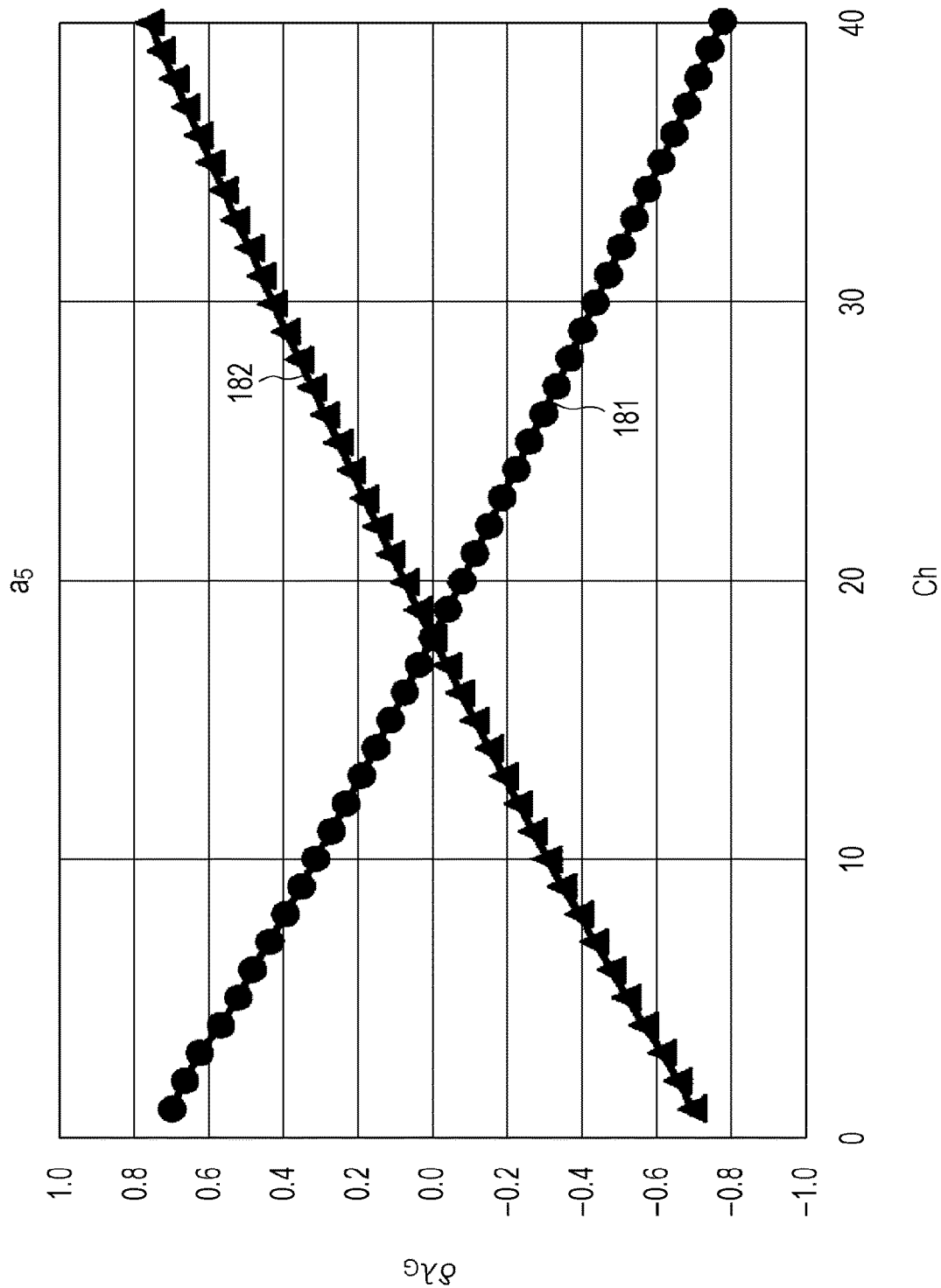
FIG. 18 is a graph of deviated amount of the center wavelength in the channel of each sensor, the deviated amount being caused by a mechanical error a5.

Reference numeral 181 of FIG. 18 represents the deviated amount $\delta\lambda_G$ of the center wavelength in the spectral sensitivity of each channel Ch in a case where the arrangement error as is deviated from 0 by +1 unit, and reference numeral 182 represents the deviated amount $\delta\lambda_G$ of the center wavelength in the spectral sensitivity of each channel Ch in a case where the arrangement error as is deviated from 0 by −1 unit. Relationships 181 and 182 are acquired by optical simulation. The coefficient $\delta\lambda_{G5}(i)$ is, for example, acquired with relationships 181 and 182.

Figure 19:
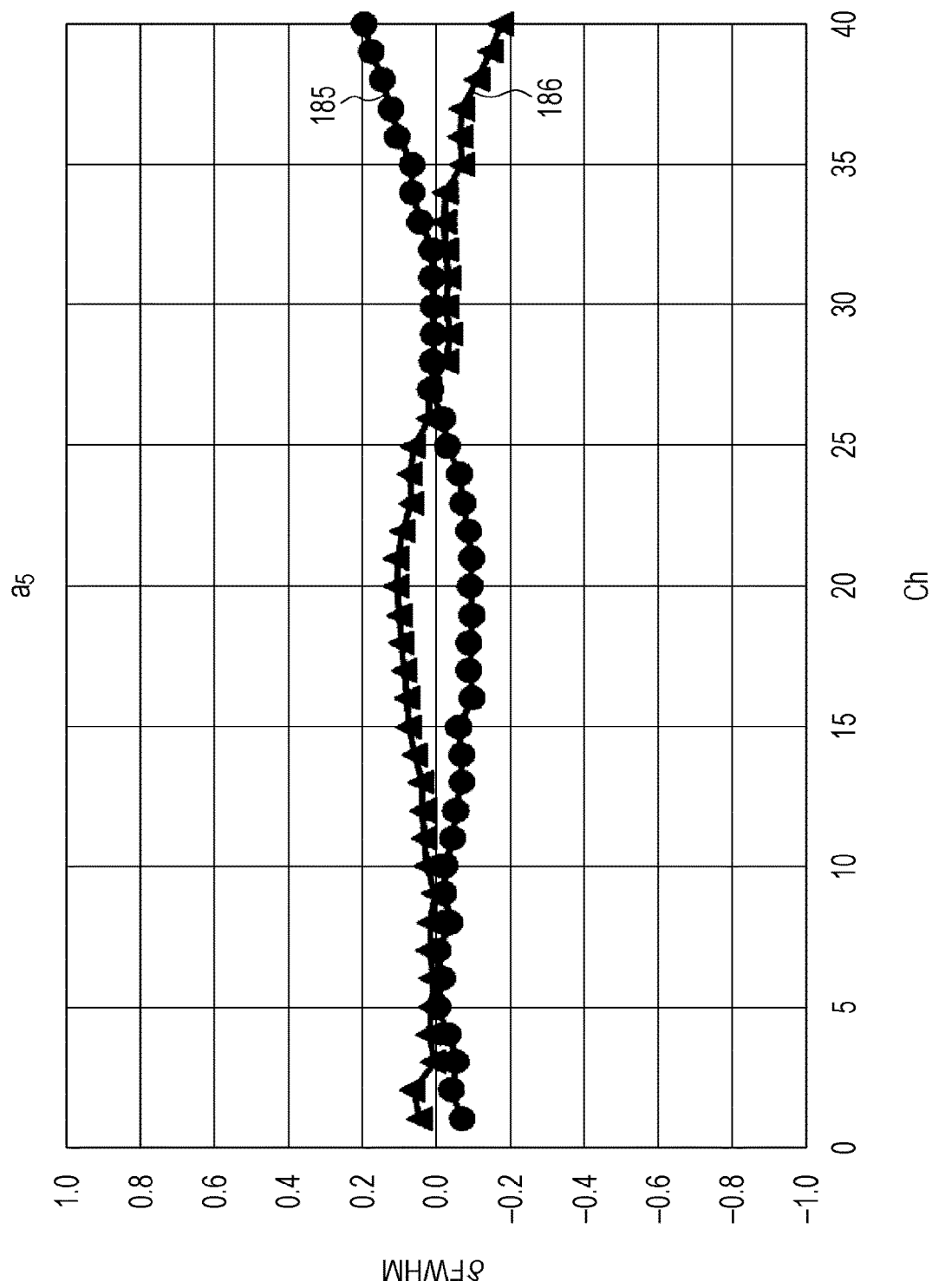
FIG. 19 is a graph of deviated amount of the full width at half maximum in the channel of each sensor, the deviated amount being caused by the mechanical error a5.

Reference numeral 185 of FIG. 19 represents the deviated amount $\delta FWHM$ of the full width at half maximum in the spectral sensitivity of the channel Ch of each of the sensors in a case where the arrangement error as is deviated from 0 by +1 unit, and reference numeral 186 represents the deviated amount $\delta FWHM$ of the full width at half maximum in the spectral sensitivity of the channel Ch of each of the sensors in a case where the arrangement errors as is deviated from 0 by −1 unit. Relationships 185 and 186 are acquired by optical simulation. The coefficient $\delta FWHM_5(i)$ is, for example, acquired with relationships 185 and 186.

12.2 Calibration of Spectral Apparatus with Third Model

Figure 20:
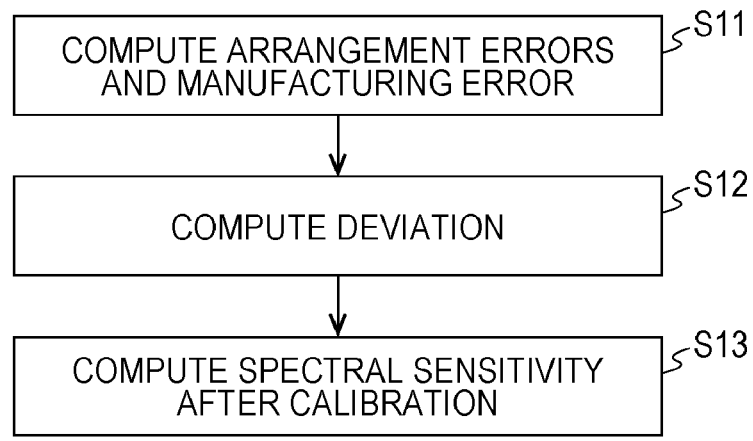
FIG. 20 is a flowchart of a procedure of calibrating the spectral apparatus.

The flowchart of FIG. 20 illustrates a procedure of calibrating the spectral apparatus with the third model.

In a case where the calibration of the spectral apparatus 100 is performed for each of the plurality of spectral apparatuses, the procedure illustrated in FIG. 20 is performed for each of the plurality of spectral apparatuses.

In a case where the calibration of the spectral apparatus 100 is performed with the third model, at step S11, the errors $a_1$, $a_2$, $a_3$, $a_4$, and as are acquired to adapt the spectral sensitivity of the sensor indicated with the center wavelength $\lambda_G(i)$ and the full width at half maximum FWHM(i), to the signal output by the sensor. Adapting the spectral sensitivity to the signal means causing the signal assumed to be output by the sensor to be close to the signal output by the sensor in practice, in a case where the real spectral sensitivity of the sensor at the position i is the spectral sensitivity of the sensor indicated with the center wavelength $\lambda_G(i)$ and the full width at half maximum FWHM(i). A response variable is used for evaluation of the adaptability. At step S11, the indicator indicating the mechanical error in the spectral apparatus 100, is acquired to adapt the spectral sensitivity of the sensor indicated by the indicator indicating the spectral sensitivity of the sensor, to the signal output by the sensor.

The outputs of sensors having sensitivity at the wavelengths $\lambda_{HgCd}(1)$, $\lambda_{HgCd}(2)$, ..., and $\lambda_{HgCd}(K_0)$ of the emission-line components, from the sensors 119-1, 119-2, ..., and 119-40, are used for the calibration.

Subsequently, at step S12, the deviation of the center wavelength $\lambda_G(i)$ from the center wavelength $\lambda_{G0}(i)$ is acquired with Expression (6) that has been created and the errors $a_1$, $a_2$, $a_3$, $a_4$, and $a_5$ that have been acquired. The deviation of the full width at half maximum FWHM(i) from the full width at half maximum $FWHM_0(i)$ is acquired with Expression (7) that has been created and the errors $a_1$, $a_2$, $a_3$, $a_4$, and $a_5$ that have been acquired. At step S12, for each of the sensor at the position i, the sensor at the position $i_2$, ..., and the sensor at the position $i_{40}$, the deviation of the indicator indicating the spectral sensitivity of the sensor from the indicator indicating the reference spectral sensitivity of the sensor, is acquired with the third model that has been created and the indicator indicating the mechanical error in the spectral apparatus 100, that has been acquired.

Subsequently, at step S13, the spectral sensitivity of the sensor at the position i is acquired with the reference spectral sensitivity of the sensor at the position i, the deviation of the center wavelength $\lambda_G(i)$ from the center wavelength $\lambda_{G0}(i)$, and the deviation of the full width at half maximum FWHM (i) from the full width at half maximum $FWHM_0(i)$, that have been acquired. With this arrangement, for each of the sensor at the position $i_1$, the sensor at the position $i_2$, ..., and the sensor at the position $i_{40}$, the spectral sensitivity of the sensor is acquired with the reference spectral sensitivity of the sensor and the deviation of the indicator indicating the spectral sensitivity of the sensor from the indicator indicating the reference spectral sensitivity of the sensor, that have been acquired.

As illustrated in FIG. 6, the spectral sensitivity of the sensor at the position i is acquired by enlarging the reference spectral sensitivity the ratio (i) times along the wavelength axis, with the center wavelength $\lambda_{G0}(i)$ centered, and moving the reference spectral sensitivity that has been enlarged, by $\Delta \lambda_G(i)$ along the wavelength axis.

The ratio ratio(i) is expressed by Expression (8).

[Mathematical Formula 8]

$$\begin{aligned} ratio(i) &= \frac{FWHM(i)}{FWHM_0(i)} \\ &= 1 + \frac{1}{FWHM_0} \cdot \\ & \quad (a_1 \cdot \delta FWHM_1(i) + a_2 \cdot \delta FWHM_2(i) + \\ & \quad a_3 \cdot \delta FWHM_3(i) + a_4 \cdot \delta FWHM_4(i) + \\ & \quad a_5 \cdot \delta FWHM_5(i)) \end{aligned} \quad (8)$$

In the case where the calibration of the spectral apparatus 100 is performed with the third model, since each of the center wavelength $\lambda_{G0}(i)$ and the full width at half maximum $FWHM_0(i)$ is expressed by the linear functions of the errors $a_1$, $a_2$, $a_3$, $a_4$, and as, the adaptability of the spectral sensitivity to the signal does not vary greatly even in a case where the errors $a_1$, $a_2$, $a_3$, $a_4$, and as vary. Therefore, the errors $a_1$, $a_2$, $a_3$, $a_4$, and as are appropriately acquired and the calibrated spectral sensitivity of the sensor is appropriately acquired.

In the case where the calibration of the spectral apparatus 100 is performed with the third model, since each of the center wavelength $\lambda_G(i)$ and the full width at half maximum $FWHM_0(i)$ is expressed by the errors $a_1$, $a_2$, $a_3$, $a_4$, and as being the explanatory variables in common, the number of explanatory variables reduces in comparison to a case where the center wavelength and the full width at half maximum each are expressed by different explanatory variables, and thus the number of emission-line components necessary for the calibration of the spectral apparatus 100 reduces.

Furthermore, in the case where the calibration of the spectral apparatus 100 is performed with the third model, since the center wavelength $\lambda_G(i)$ and the full width at half maximum $FWHM_0(i)$ are expressed by the errors $a_1$, $a_2$, $a_3$, $a_4$, and as being the explanatory variables in common, the relationship between the center wavelength $\lambda_{G0}(i)$ and the full width at half maximum $FWHM_0(i)$ does not become inappropriate and thus the center wavelength $\lambda_{G0}(i)$ and the full width at half maximum $FWHM_0(i)$ are appropriately acquired.

13. Procedure of Adapting Spectral Sensitivity to Signal

In the following, the emission-line component having a wavelength of $\lambda_{HgCd}(k)$ is defined to be incident over the sensor at a position $I_k$ and the sensor at the position $I_{k+1}$. The center wavelength in the reference spectral sensitivity of the sensor at the position $I_{k+1}$ is adjacent to the center wavelength in the reference spectral sensitivity of the sensor at the position $I_k$. The identification number k of the emission-line component is defined to take any value of 1, 2, ..., and $K_0$.

Figure 21:
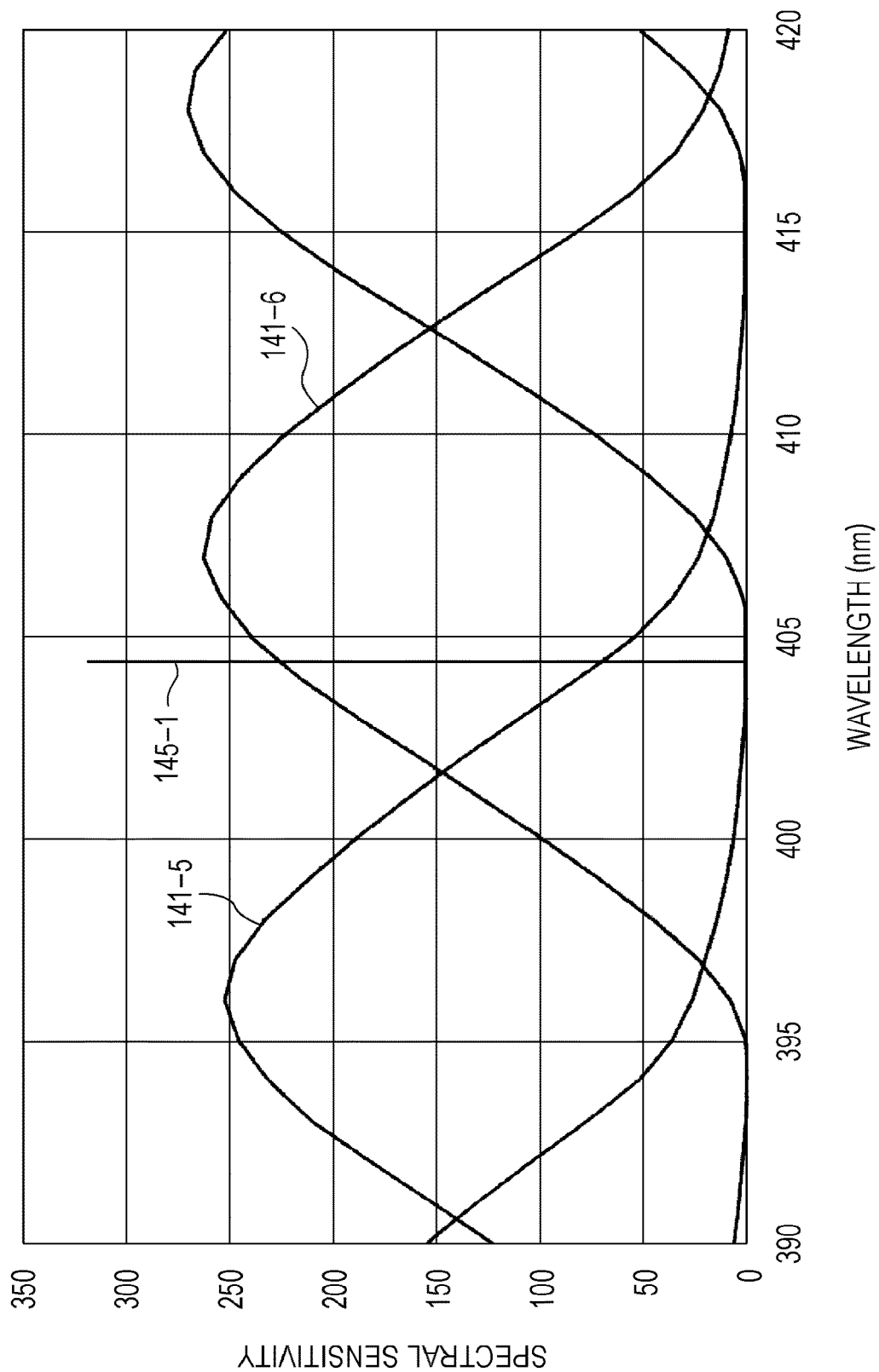
FIG. 21 is a graph exemplarily illustrating the spectral sensitivity of each sensor and an emission-line spectrum.

The graph of FIG. 21 exemplarily illustrates the spectral sensitivity of each sensor and an emission-line spectrum of the light to be measured for emission-line calibration. The graph of FIG. 21 is acquired by enlarging a range of 390 nm to 420 nm in wavelength in the graph of FIG. 5.

The emission-line component 145-1 being 404.54 nm in wavelength, is incident over the sensor having the spectral sensitivity 141-5 being approximately 396 nm in center wavelength and the sensor having the spectral sensitivity 141-6 being approximately 407 nm in center wavelength. Therefore, the sensor having the spectral sensitivity 141-5 and the sensor having the spectral sensitivity 141-6 each have sensitivity to the emission-line component 145-1 as illustrated in FIG. 21.

Figure 22:
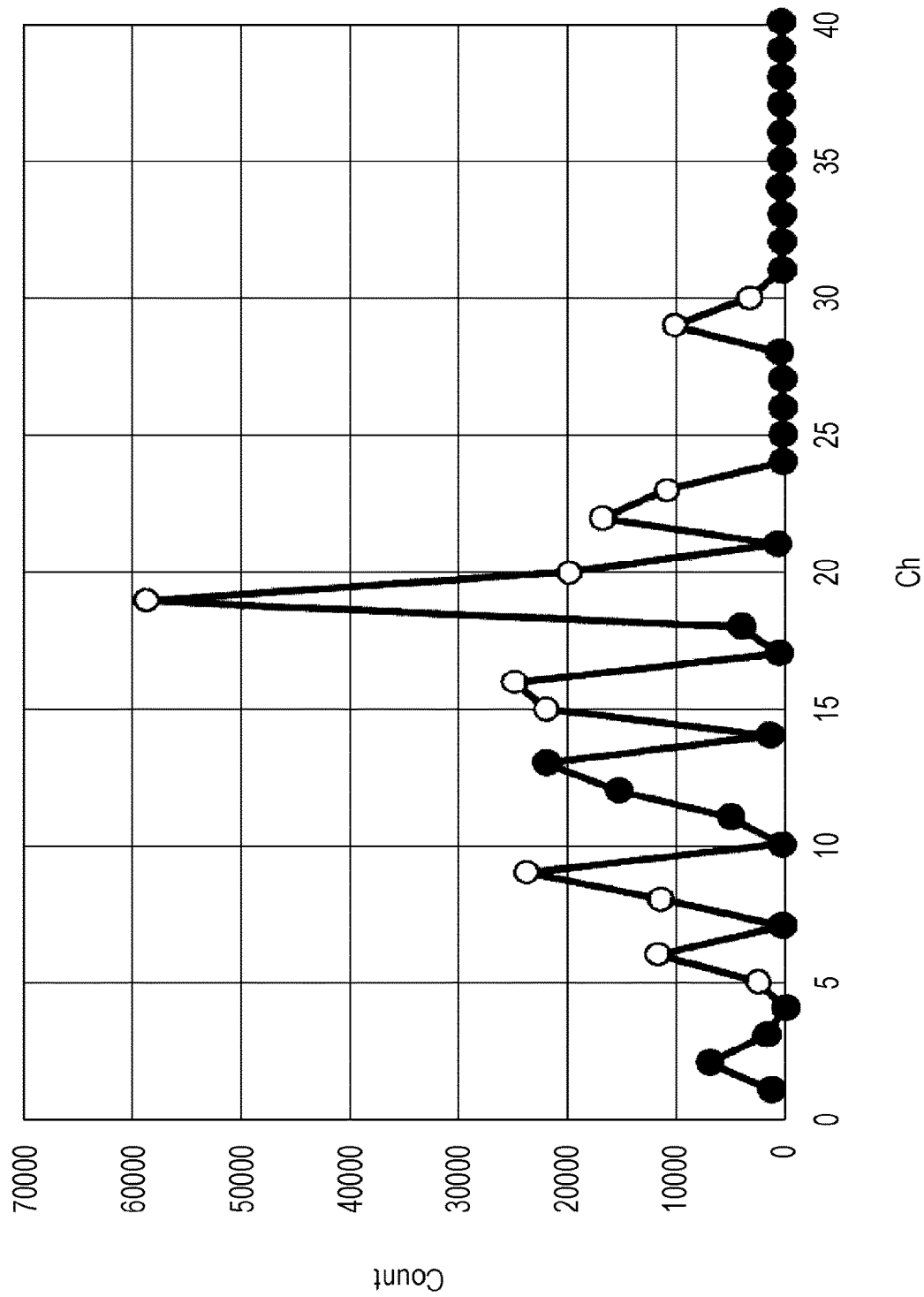
FIG. 22 is a graph of the relationship between the channels of the sensors and measured signals in emission-line light source measurement.

The graph of FIG. 22 illustrates the relationship between the channels of the sensors and the signals output by the sensors.

The sensor having channel 5 and the sensor having channel 6 each have sensitivity to the emission-line component 145-1; the sensor having channel 8 and the sensor having channel 9 each have sensitivity to the emission-line component 145-2; the sensor having channel 15 and the sensor having channel 16 each have sensitivity to the emission-line component 145-3; the sensor having channel 19 and the sensor having channel 20 each have sensitivity to the emission-line component 145-4; the sensor having channel 22 and the sensor having channel 23 each have sensitivity to the emission-line component 145-5; and the sensor having channel 29 and the sensor having channel 30 each have sensitivity to the emission-line component 145-6. As a result, signals illustrated in FIG. 22 are acquired.

In a case where the calibration of the spectral apparatus 100 is completely performed with the emission-line component being $\lambda_{HgCd}(1)$ in wavelength, the emission-line component being $\lambda_{HgCd}(2)$ in wavelength, ..., and the emission-line component being $\lambda_{HgCd}(K_0)$ in wavelength, the spectral sensitivity Response(i, $\lambda$) of the sensor at the position i and the signal value Count(i) acquired by analog-to-digital converting the signal output by the sensor at the position i satisfy the relationships indicated by Expressions (9) and (10) for k=1, 2, ..., and $K_0$.

[Mathematical Formula 9]

$$Response(I_k, \lambda_{HgCd}(k)) = Count(I_k) \quad (9)$$

[Mathematical Formula 10]

$$Response(I_{k+1}, \lambda_{HgCd}(k)) = Count(I_{k+1}) \quad (10)$$

In a case where the sensor at the position $I_k$ and the sensor at the position $I_{k+1}$ are selected, each having sensitivity at the wavelength $\lambda_{HgCd}(k)$, Expressions (9) and (10) indicate, for k=1, 2, ..., and $K_0$, the sensitivity Response($I_k$, $\lambda_{HgCd}(k)$) at the wavelength $\lambda_{HgCd}(k)$ in the spectral sensitivity of the sensor at the position $I_k$, agreeing with the signal value Count($I_k$) indicating the signal output by the sensor at the position $I_k$, and the sensitivity Response($I_{k+1}$, $\lambda_{HgCd}(k)$) at the wavelength $\lambda_{HgCd}(k)$ in the spectral sensitivity of the sensor at the position $I_{k+1}$, agreeing with the signal value Count($I_{k+1}$) indicating the signal output by the sensor at the position $I_{k+1}$, respectively.

Adapting a spectral sensitivity set to a signal set means causing the relationship between the sensitivity Response($I_k$, $\lambda_{HgCd}(k)$) and the signal value Count($I_k$) to be close to the relationship indicated by Expression (9) and causing the relationship between the sensitivity Response($I_{k+1}$, $\lambda_{HgCd}$(k)) and the signal value Count($I_{k+1}$) to be close to the relationship indicated by Expression (10).

Therefore, a first method of adapting the spectral sensitivity to the signal includes acquiring the errors $a_1$, $a_2$, $a_3$, $a_4$, and $a_5$ to minimize a response variable F indicated by Expression (11).

[Mathematical Formula 11]

$$F = \sum_{k=1}^{K_0} ((\text{Response}(I_k, \lambda_{HgCd}(K)) - \text{Count}(I_k))^2 + (\text{Response}(I_{k+1}, \lambda_{HgCd}(K+1)) - \text{Count}(I_{k+1}))^2) \quad (11)$$

The response variable F indicated by Expression (11) totals, for k=1, 2, . . . , and $K_0$, the sum of the square of the deviation of the sensitivity Response($I_k$, $\lambda_{HgCd}$(k)) from the signal value Count($I_k$) and the square of the deviation of the sensitivity Response($I_{k+1}$, $\lambda_{HgCd}$(k)) from the signal value Count($I_{k+1}$).

The square of each deviation may be replaced with a different factor having an absolute value increasing as the absolute value of the deviation increases. For example, the square of each deviation may be replaced with the absolute value of the deviation.

If three sensors having sensitivity to the emission-line wavelength $\lambda_{HgCd}$(k) are present ($I_{k-1}$, $I_k$, and $I_{k+1}$), the deviated amount between the signal Count($I_{k-1}$) and the sensitivity Response($I_{k-1}$) may be added to the response function.

Expression (12) is derived from Expressions (9) and (10).

[Mathematical Formula 12]

$$\frac{\text{Response}(I_{k+1}, \lambda_{HgCd}(K))}{\text{Response}(I_k, \lambda_{HgCd}(K))} = \frac{\text{Count}(I_{k+1})}{\text{Count}(I_k)} \quad (12)$$

Adapting the spectral sensitivity to the signal means causing the relationship between the sensitivity Response($I_k$, $\lambda_{HgCd}$(k)), the sensitivity Response($I_{k+1}$, $\lambda_{HgCd}$(k)), the signal value Count($I_k$), and the signal value Count($I_{k+1}$), to be close to the relationship indicated by Expression (12).

Therefore, a second method of adapting the spectral sensitivity to the signal includes acquiring the errors $a_1$, $a_2$, $a_3$, $a_4$, and $a_5$ to minimize the response variable F indicated by Expression (13).

[Mathematical Formula 13]

$$F = \sum_{k=1}^{K_0} \left( \frac{\text{Response}(I_{k+1}, \lambda_{HgCd}(K))}{\text{Response}(I_k, \lambda_{HgCd}(K))} = \frac{\text{Count}(I_{k+1})}{\text{Count}(I_k)} \right)^2 \quad (13)$$

The response function F indicated by Expression (13) totals, for k=1, 2, . . . , and $K_0$, the deviation of the ratio of the sensitivity Response($I_{k+1}$, $\lambda_{HgCd}$(k)) to the sensitivity Response($I_k$, $\lambda_{HgCd}$(k)) from the ratio of the signal value Count($I_{k+1}$) to the signal value Count($I_k$).

According to the response function F indicated by Expression (13), there is no need to normalize the spectral sensitivity Response(i, $\lambda$) so that the sensitivity Response($I_k$, $\lambda_{HgCd}$(k)) and the sensitivity Response($I_{k+1}$, $\lambda_{HgCd}$(k)) can be compared with the signal value Count($I_k$) and the signal value Count($I_{k+1}$), respectively.

If the three sensors having the sensitivity to the emission-line wavelength $\lambda_{HgCd}$(k) are present ($I_{k-1}$, $I_k$, and $I_{k+1}$), the deviated amount of the deviated amount between the ratio of the signal Count($I_k$) and the signal Count($I_{k-1}$) and the ratio of the sensitivity Response($I_k$) and the sensitivity Response($I_{k-1}$), may be added to the response function, in addition to the deviated amount between the ratio of the signal Count ($I_k$) and the signal Count($I_{k+1}$) and the ratio of the sensitivity Response($I_k$) and the sensitivity Response($I_{k+1}$).

14. Production of Calibrated Spectral Apparatus

Figure 23:
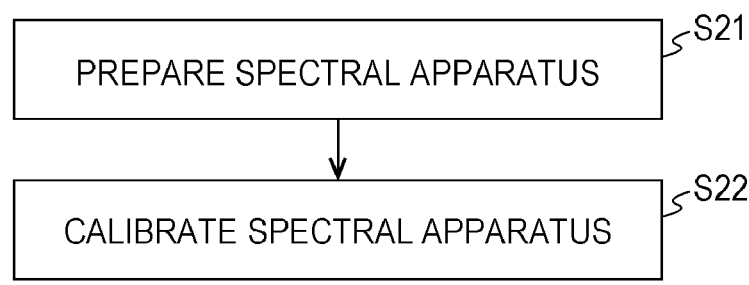
FIG. 23 is a flowchart of a procedure of producing a calibrated spectral apparatus.

In production of a calibrated spectral apparatus, as illustrated in FIG. 23, the spectral apparatus 100 is prepared at step S21, and the spectral apparatus 100 that has been prepared, is calibrated at step S22. At step S21, a business entity that performs the calibration of the spectral apparatus 100, may manufacture the spectral apparatus 100 so that the spectral apparatus 100 is prepared, or the business entity that performs the calibration of the spectral apparatus 100, may purchase the spectral apparatus 100 from a different business entity so that the spectral apparatus 100 is prepared.

REFERENCE SIGNS LIST 100 spectral apparatus
111 optical system
112 linear array sensor
115 slit plate
116 concave diffraction grating
119-1, 119-2, . . . , 119-40 sensors
122 slit
143 HgCd lamp

The invention claimed is:

1. A method of creating a model used for calibration of a spectral apparatus, the spectral apparatus including: an optical system that converts light to be measured into a spectrum; and a light-receiving sensor including a plurality of sensors that outputs a plurality of signals, the plurality of sensors including sensors that output signals indicating respective energy amounts of a plurality of wavelength components included in the spectrum;

the method creating the model used for the calibration with the model in which a linear function of an indicator indicating a mechanical error in the spectral apparatus, expresses deviation of an indicator indicating spectral sensitivity of the sensor from the indicator indicating the reference spectral sensitivity of the sensor, wherein the method comprises:
a step a) of acquiring, for each of the plurality of sensors, reference spectral sensitivity of the sensor;
a step b) of acquiring, for each of the plurality of sensors, an indicator indicating the reference spectral sensitivity of the sensor acquired at the step a); and
a step c) of creating, for each of the plurality of sensors, the model in which the linear function of the indicator indicating the mechanical error in the spectral apparatus, expresses deviation of the indicator indicating spectral sensitivity of the sensor from the indicator indicating the reference spectral sensitivity of the sensor, acquired at the step b),
wherein the indicator indicating the reference spectral sensitivity of the sensor, acquired at the step b), includes a center wavelength and a full width at half maximum in the reference spectral sensitivity of the sensor, the indicator indicating the spectral sensitivity of the sensor, included in the model created at the step c), includes a center wavelength and a full width at half maximum in the spectral sensitivity of the sensor, the step c), for each of the plurality of sensors, includes:
creating a first expression in which a first linear function of the indicator indicating the mechanical error in the spectral apparatus expresses deviation of the center wavelength in the spectral sensitivity of the sensor from the center wavelength in the reference spectral sensitivity of the sensor; and creating a second expression in which a second linear function of the indicator indicating the mechanical error in the spectral apparatus expresses deviation of the full width at half maximum in the spectral sensitivity of the sensor from the full width at half maximum in the reference spectral sensitivity of the sensor, and the model created at the step c) includes the first expression and the second expression.

2. A method of creating a model used for calibration of a spectral apparatus, the spectral apparatus including: an optical system that converts light to be measured into a spectrum; and a light-receiving sensor including a plurality of sensors that outputs a plurality of signals, the plurality of sensors including sensors that output signals indicating respective energy amounts of a plurality of wavelength components included in the spectrum;

the method creating the model used for the calibration with the model in which a linear function of an indicator indicating a mechanical error in the spectral apparatus, expresses deviation of an indicator indicating spectral sensitivity of the sensor from the indicator indicating the reference spectral sensitivity of the sensor, wherein the method comprises:

a step a) of acquiring, for each of the plurality of sensors, reference spectral sensitivity of the sensor;

a step b) of acquiring, for each of the plurality of sensors, an indicator indicating the reference spectral sensitivity of the sensor acquired at the step a); and a step c) of creating, for each of the plurality of sensors, the model in which the linear function of the indicator indicating the mechanical error in the spectral apparatus, expresses deviation of the indicator indicating spectral sensitivity of the sensor from the indicator indicating the reference spectral sensitivity of the sensor, acquired at the step b), wherein the light-receiving sensor has a light-receiving surface, the plurality of sensors is arranged in a first direction on the light-receiving surface, the optical system has an optical axis extending in a second direction, the optical axis leading to the light-receiving surface, and the indicator indicating the mechanical error in the spectral apparatus, included in the model created at the step c), includes all or part of an arrangement error of the light-receiving sensor in the first direction, an arrangement error of the light-receiving sensor in the second direction, and an arrangement error of the light-receiving sensor in a turning direction around an axis orthogonal to the first direction and the optical axis leading to the light-receiving surface.

3. A method of creating a model used for calibration of a spectral apparatus, the spectral apparatus including: an optical system that converts light to be measured into a spectrum; and a light-receiving sensor including a plurality of sensors that outputs a plurality of signals, the plurality of sensors including sensors that output signals indicating respective energy amounts of a plurality of wavelength components included in the spectrum;

the method creating the model used for the calibration with the model in which a linear function of an indicator indicating a mechanical error in the spectral apparatus, expresses deviation of an indicator indicating spectral sensitivity of the sensor from the indicator indicating the reference spectral sensitivity of the sensor, wherein the method comprises:

a step a) of acquiring, for each of the plurality of sensors, reference spectral sensitivity of the sensor;

a step b) of acquiring, for each of the plurality of sensors, an indicator indicating the reference spectral sensitivity of the sensor acquired at the step a); and a step c) of creating, for each of the plurality of sensors, the model in which the linear function of the indicator indicating the mechanical error in the spectral apparatus, expresses deviation of the indicator indicating spectral sensitivity of the sensor from the indicator indicating the reference spectral sensitivity of the sensor, acquired at the step b), wherein the optical system includes:

a slit plate including a slit formed; and a diffraction grating having a principal section and a diffraction surface, the optical system having an optical axis leading from the slit to the diffraction surface, and the indicator indicating the mechanical error in the spectral apparatus, included in the model created at the step c), includes a manufacturing error in a width of the slit in a direction parallel to the principal section, the direction being perpendicular to the optical axis leading from the slit to the diffraction surface.

4. A method of creating a model used for calibration of a spectral apparatus, the spectral apparatus including: an optical system that converts light to be measured into a spectrum; and a light-receiving sensor including a plurality of sensors that outputs a plurality of signals, the plurality of sensors including sensors that output signals indicating respective energy amounts of a plurality of wavelength components included in the spectrum;

the method creating the model used for the calibration with the model in which a linear function of an indicator indicating a mechanical error in the spectral apparatus, expresses deviation of an indicator indicating spectral sensitivity of the sensor from the indicator indicating the reference spectral sensitivity of the sensor, wherein the method comprises:

a step a) of acquiring, for each of the plurality of sensors, reference spectral sensitivity of the sensor;

a step b) of acquiring, for each of the plurality of sensors, an indicator indicating the reference spectral sensitivity of the sensor acquired at the step a); and a step c) of creating, for each of the plurality of sensors, the model in which the linear function of the indicator indicating the mechanical error in the spectral apparatus, expresses deviation of the indicator indicating spectral sensitivity of the sensor from the indicator indicating the reference spectral sensitivity of the sensor, acquired at the step b), wherein the optical system includes a diffraction grating having a principal section, and the indicator indicating the mechanical error in the spectral apparatus, included in the model created at the step c), includes an arrangement error of the diffraction grating in a turning direction in which the principal section remains flush.

5. A method of creating a model used for calibration of a spectral apparatus, the spectral apparatus including: an optical system that converts light to be measured into a spectrum; and a light-receiving sensor including a plurality of sensors that outputs a plurality of signals, the plurality of sensors including sensors that output signals indicating respective energy amounts of a plurality of wavelength components included in the spectrum;

the method creating the model used for the calibration with the model in which a linear function of an indicator indicating a mechanical error in the spectral apparatus, expresses deviation of an indicator indicating spectral sensitivity of the sensor from the indicator indicating the reference spectral sensitivity of the sensor, wherein the method comprises:

a step a) of acquiring, for each of the plurality of sensors, reference spectral sensitivity of the sensor;

a step b) of acquiring, for each of the plurality of sensors, an indicator indicating the reference spectral sensitivity of the sensor acquired at the step a); and a step c) of creating, for each of the plurality of sensors, the model in which the linear function of the indicator indicating the mechanical error in the spectral apparatus, expresses deviation of the indicator indicating spectral sensitivity of the sensor from the indicator indicating the reference spectral sensitivity of the sensor, acquired at the step b), wherein the step b) includes acquiring the reference spectral sensitivity of the sensor by optical simulation, and the step c) includes: acquiring, by optical simulation, a deviated amount of the indicator indicating the spectral sensitivity of the sensor to deviation of the indicator indicating the mechanical error in the spectral apparatus, in a unit amount; and adding and subtracting the deviated amount per unit error amount, acquired with the indicator indicating the mechanical error in the spectral apparatus, in the linear function of the indicator indicating the mechanical error in the spectral apparatus, included in the model created at the step c).

6. A method of producing a calibrated spectral apparatus, the method comprising:

a step of preparing a spectral apparatus; and a step of calibrating the spectral apparatus with a model created by a method of creating a model used for calibration of the spectral apparatus, the spectral apparatus including: an optical system that converts light to be measured into a spectrum; and a light-receiving sensor including a plurality of sensors that outputs a plurality of signals, the plurality of sensors including sensors that output signals indicating respective energy amounts of a plurality of wavelength components included in the spectrum;

the method creating the model used for the calibration with the model in which a linear function of an indicator indicating a mechanical error in the spectral apparatus, expresses deviation of an indicator indicating spectral sensitivity of the sensor from the indicator indicating the reference spectral sensitivity of the sensor, wherein the method creating the model comprises:

a step a) of acquiring, for each of the plurality of sensors, reference spectral sensitivity of the sensor;

a step b) of acquiring, for each of the plurality of sensors, an indicator indicating the reference spectral sensitivity of the sensor acquired at the step a); and a step c) of creating, for each of the plurality of sensors, the model in which the linear function of the indicator indicating the mechanical error in the spectral apparatus, expresses deviation of the indicator indicating spectral sensitivity of the sensor from the indicator indicating the reference spectral sensitivity of the sensor, acquired at the step b), wherein the light-receiving sensor has a light-receiving surface, the plurality of sensors is arranged in a first direction on the light-receiving surface, the optical system has an optical axis extending in a second direction, the optical axis leading to the light-receiving surface, and the indicator indicating the mechanical error in the spectral apparatus, included in the model created at the step c), includes all or part of an arrangement error of the light-receiving sensor in the first direction, an arrangement error of the light-receiving sensor in the second direction, and an arrangement error of the light-receiving sensor in a turning direction around an axis orthogonal to the first direction and the optical axis leading to the light-receiving surface.

* * * * *